(12) United States Patent
Joannopoulos et al.

(10) Patent No.: US 7,339,539 B2
(45) Date of Patent: Mar. 4, 2008

(54) PHOTONIC CRYSTAL EXHIBITING NEGATIVE REFRACTION WITHOUT REQUIRING A NEGATIVE EFFECTIVE INDEX

(75) Inventors: John D. Joannopoulos, Belmont, MA (US); Chiyan Luo, West Roxbury, MA (US); Steven G. Johnson, St. Charles, IL (US); Yoel Fink, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 10/409,995

(22) Filed: Apr. 9, 2003

(65) Prior Publication Data

US 2003/0227415 A1    Dec. 11, 2003

Related U.S. Application Data

(60) Provisional application No. 60/407,169, filed on Aug. 30, 2002, provisional application No. 60/370,977, filed on Apr. 9, 2002.

(51) Int. Cl.
*H01Q 19/06* (2006.01)
*H01Q 15/02* (2006.01)

(52) U.S. Cl. ........................ 343/754; 343/909
(58) Field of Classification Search ........... 343/754, 343/909, 911 R; 385/125
See application file for complete search history.

(56) References Cited

U.S. PATENT DOCUMENTS

| 5,386,215 A | * | 1/1995 | Brown ..................... 343/795 |
| 5,406,573 A | * | 4/1995 | Ozbay et al. ............... 372/43 |
| 5,541,613 A | * | 7/1996 | Lam et al. ................ 343/792.5 |
| 5,600,342 A | * | 2/1997 | Pikulski et al. ............ 343/909 |
| 5,739,796 A | * | 4/1998 | Jasper et al. .............. 343/895 |
| 6,469,682 B1 | * | 10/2002 | de Maagt et al. ........... 343/909 |
| 6,542,682 B2 | * | 4/2003 | Cotteverte et al. ......... 385/125 |
| 6,593,894 B1 | * | 7/2003 | Biswas et al. ............ 343/793 |
| 6,621,448 B1 | * | 9/2003 | Lasky et al. ............... 342/22 |
| 2001/0038325 A1 | | 11/2001 | Smith et al. | |

FOREIGN PATENT DOCUMENTS

JP          2000066002          3/2000

OTHER PUBLICATIONS

Pendry, J.B., "Negative Refraction Makes a Perfect Lens", Physical Review Letters, vol. 85, No. 18, Oct. 30, 2000, pp. 3966-3969.*
"Three-Dimensionally Periodic Dielectric Layered Structure with Omnidirectional Photonic Band Gap," Johnson et al. *Applied Physics Letters*. Nov. 2000. vol. 77.
"Electrodynamics of Substances with Simultaneously Negative Electrical and Magnetic Permeabilities," Veselago. P.N. *Lebedev Physical Institute*. Academy of Sciences of the USSR, no date.

(Continued)

*Primary Examiner*—Michael C. Wimer
(74) *Attorney, Agent, or Firm*—Gauthier & Connors LLP

(57) ABSTRACT

A periodic electromagnetic medium is disclosed that includes a surface that provides an interface with an ambient medium and a periodic structure that provides negative refraction within the medium of an incident electromagnetic field incident on the surface. In various embodiments the incident electromagnetic field is within a range of frequencies, the medium may include dielectric or metallic material, and has either a positive or negative effective index.

30 Claims, 30 Drawing Sheets

OTHER PUBLICATIONS

"The Electrodynamics of Substances with Simultaneously Negative Values of e and µ," Veselago. P.N. *Lebedev Physical Institute*. Academy of Sciences of the USSR. Jul. 1964.

"Experimental Verification of a Negative Index of Refraction," Shelby et al. *Science*. Apr. 2001. vol. 292.

"Loop-Wire Medium for Investigating Plasmons at Microwave Frequencies," Smith et al. *Applied Physics Letters*. Sep. 1999. vol. 75, No. 10.

"Composite Medium with Simultaneously Negative Permeability and Permittivity," Smith et al. *Physical Review Letters*. May 2000. vol. 84.

"Magnetism from Conductors and Enhanced Nonlinear Phenomena," Pendry et al. *IEEE Transactions on Microwave Theory and Techniques*. Nov. 1999. vol. 47.

"Extremely Low Frequency Plasmons in Metallic Mesostructures," Pendry et al. *Physical Review Letters*. Jun. 1996. vol. 76.

"Negative Refraction Makes a Perfect Lens," Pendry et al. *Physical Review Letters*. Oct. 2000. vol. 85.

"Superprism Phenomena in Photonic Crystals," Kosaka et al. *Physical Review B*. Oct. 1998. vol. 58.

"Theory of Light in Propagation in Strongly Modulated Photonic Crystals: Refractionlike Behavior in the Vicinity of the Photonic Band Gap," Notomi. *Physical Review B*. Oct. 2000.

"Theory of light propagation in strongly modulated photonic crystals: refractionlike behavior in the vicinity of the photonic band gap," M. Notomi. *Physical Review B*. vol. 62, No. 16. Oct. 2000.

"Negative Refraction Makes a Perfect Lens," J.B. Pendry. *Physical Review Letters*. vol. 85, No. 18. Oct. 2000.

\* cited by examiner

PHOTONIC CRYSTAL EXHIBITING NEGATIVE REFRACTION WITHOUT REQUIRING A NEGATIVE EFFECTIVE INDEX

PRIORITY INFORMATION

The present application claims priority to U.S. Provisional Patent Application Ser. No. 60/370,977 filed Apr. 9, 2002; and U.S. Provisional Patent Application Ser. No. 60/407,169 filed Aug. 30, 2002.

This invention was made with government support under Grant No. DMR-9808941 awarded by NSF. The government has certain rights in the invention.

BACKGROUND OF THE INVENTION

The invention relates to materials and devices for use with electromagnetic fields and relates in particular to materials and devices through which electromagnetic fields may be propagated in unconventional ways.

For example, the propagation of electromagnetic fields at microwave frequencies through substances with negative values of electrical permittivity and magnetic permeability are disclosed in *The Electrodynamics of Substances with Simultaneously Negative Values of $\epsilon$ and $\mu$*, by V. G. Veselago, SOVIET PHYSICS USPEKHI, vol. 10, No. 4 (January-February 1968). Such substances are disclosed in this article as having a negative group velocity and are referred to as left-handed substances.

U.S. Patent Application Publication 2001/0038325 discloses a left-handed composite media for use at microwave frequencies in which negative effective electrical permittivity and negative effective magnetic permeability are simultaneously provided. See also, *Composite Medium with Simultaneously Negative Permeability and Permittivity*, by D. R. Smith, W. J. Padilla, D. C. Vier, S. C. Nemat-Nasser, and S. Schultz, PHYSICAL REVIEW LETTERS, vol. 84, No. 18 (May 2000); *Experimental Verification of a Negative Index of Refraction*, R. A Shelby, D. R Smith, and S. Schultz, SCIENCE, vol. 292, pp. 77-79 (April 2001); and *Loop-Wire Medium for Investigating Plasmons at Microwave Frequencies*, by D. R. Smith, D. C. Vier, W. J. Padilla, S. C. Nemat-Nasser, and S. Schultz, APPLIED PHYSICS LETTERS, vol. 75, No. 10 (September 1999).

The use of such devices to achieve negative refraction in a microwave lens is disclosed in *Negative Refraction Makes a Perfect Lens*, by J. B. Pendry, PHYSICAL REVIEW LETTERS, vol. 85, No. 18 (October 2000). See also, *Magnetism from Conductors and Enhanced Nonlinear Phenomena*, by J. B. Pendry, A. J. Holden, D. J. Robbins and W. J. Stewart, IEEE TRANSACTIONS ON MICROWAVE THEORY AND TECHNIQUES, vol. 47, No. 11 (November 1999); and *Extremely Low Frequency Plasmas in Metallic Mesostructures*, by J. B. Pendry, A. J. Holden, and W. J. Stewart, PHYSICAL REVIEW LETTERS, vol. 76, No. 25 (June 1996).

The above-described materials and devices are disclosed to provide a negative index of refraction for incident radiation at microwave frequencies, and for lowering the plasma frequency in metallic mesostructures into the far infrared and even up to 8.2 GHz band. Such materials, however, are typically limited by the physical size of the metallic components in the structure that provide the negative permittivity and negative permeability under the appropriate radiation frequencies. The size of the components must typically be similar in scale to the wavelength of the excitation field.

A negative index of refraction for incident radiation at the frequency of light has been demonstrated using photonic crystals in *Superprism Phenomena in Photonic Crystals*, by H. Kosaka, T. Kawashime, A. Tomita, M. Notomi, T. Tamamura, T. Sato and S. Kawakami, PHYSICAL REVIEW B, vol. 58, No. 16 (October 1998). Such materials are disclosed to provide a propagation beam swing of ±90 degrees responsive to a ±12 degrees shift in the angle of incident radiation by modifying the group velocity of the incident radiation. A negative index of refraction has also been demonstrated in the vicinity of the photonic band gap in *Theory of Light Propagation in Strongly Modulated Photonic Crystals: Refractionlike Behavior in the Vicinity of the Photonic Band Gap*, by M. Notomi, PHYSICAL REVIEW B, vol. 62, No. 16 (October 2000). In particular, this article discloses that negative refraction is possible in regimes of negative group velocity and negative effective index above the first photonic band near the Brillouin zone center ($\Gamma$).

Certain applications such as high resolution superlenses, however, may require materials and devices that provide negative refraction at all incident angles for lower frequencies in the photonic band structure. There is further a need for materials and devices that provide negative refraction angles without employing a negative effective index. Additionally, as the above developments have concentrated on two-dimensional materials, there is a further need for three-dimensional materials that provide negative refraction.

SUMMARY OF THE INVENTION

The invention provides a periodic electromagnetic medium having a positive effective index in accordance with an embodiment that includes a surface that provides an interface with an ambient medium, and a periodic structure that provides negative refraction within the medium of an incident electromagnetic field incident on the surface. The incident electromagnetic field may be within a range of frequencies.

In other embodiments, the periodic electromagnetic medium may include a surface that provides an interface with an ambient medium, and a periodic structure that provides a plurality of photonic bands including a lowest photonic band and provides negative refraction within the medium of an incident electromagnetic field incident on the surface. The incident electromagnetic field may be within a range of frequencies within the lowest photonic band in accordance with an embodiment.

In other embodiments, the three-dimensional periodic electromagnetic medium may include a surface that provides an interface with an ambient medium, and a periodic structure that provides single-beam negative refraction within the medium of an incident electromagnetic field incident on the surface.

In further embodiments, the periodic electromagnetic medium has a positive effective index and includes a first surface for receiving an incident electromagnetic field having a first wavelength, a second surface for producing a focused electromagnetic field, and a periodic structure for providing a focal spot size that is smaller than the first wavelength.

In still further embodiments, the dielectric periodic electromagnetic medium may include a first surface for receiving an incident electromagnetic field having a first wavelength, a second surface for producing a focused electromagnetic field, and a periodic structure for providing a focal spot size that is smaller than the first wavelength.

BRIEF DESCRIPTION OF THE DRAWING

The following description may be further understood with reference to the accompanying drawings in which.

The drawings are shown for illustrative purposes and are not to scale.

DETAILED DESCRIPTION OF THE INVENTION

The invention provides an all-angle negative refraction effect for photonic crystals that does not employ a negative effective index of refraction. In accordance with an embodiment, a micro-superlens is described and numerically demonstrated. It has also been discovered that negative refraction may be achieved without employing materials with negative effective index. In particular, the lowest photonic band near a Brillouin zone corner furthest from Γ may actually be employed in an embodiment of the invention. This band has a positive group velocity and a positive refractive index, but a negative photonic effective mass. A single, negative-refracted beam may be achieved, therefore, for all incident angles at the selected frequency range. Such all-angle negative refraction (AANR) is essential for superlens applications.

Figure 1:
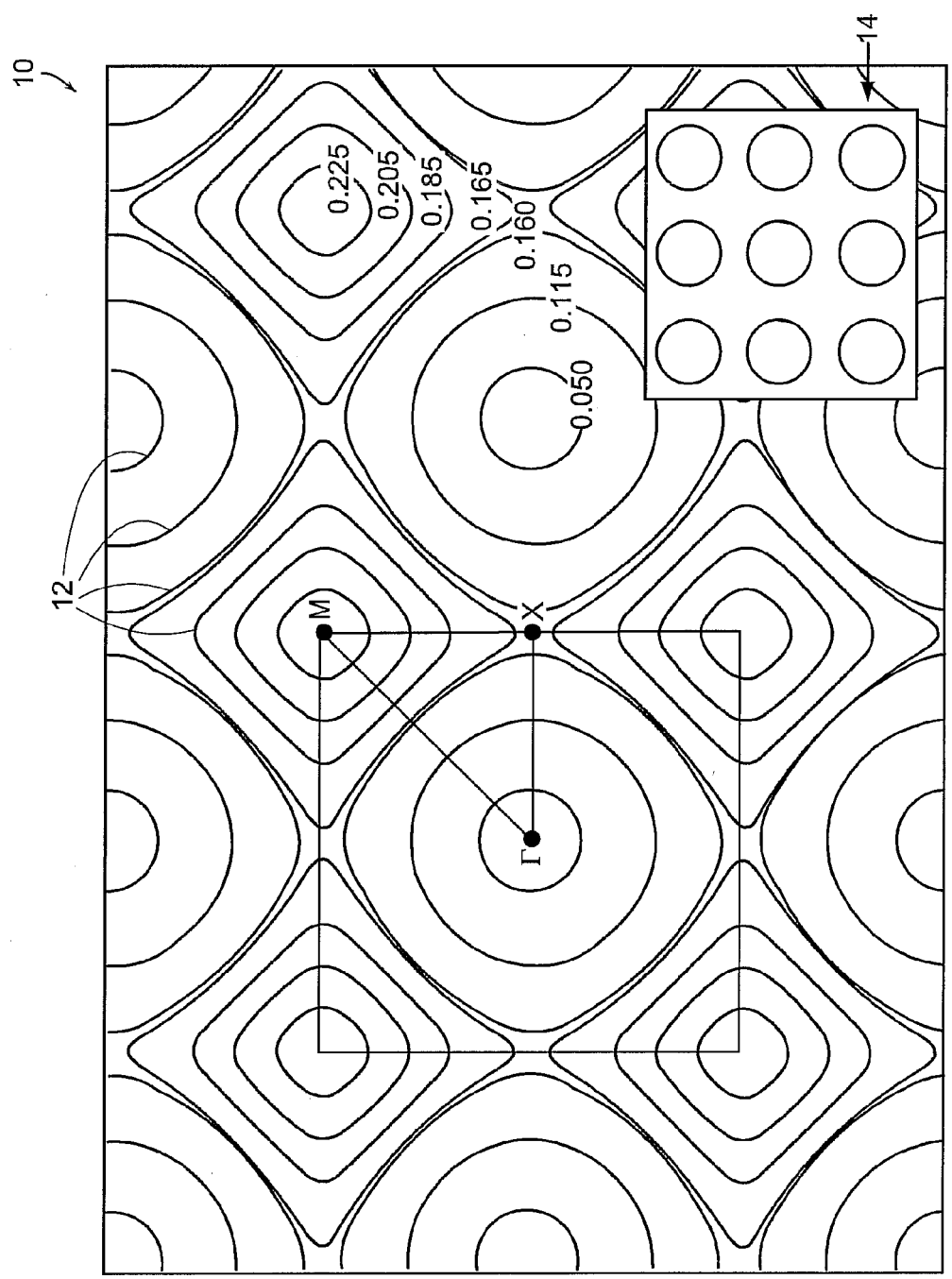
FIG. 1 shows an illustrative diagrammatic view of frequency contours of a first band of a photonic crystal in accordance with an embodiment of the invention.

For a two-dimensional photonic crystal, a square lattice of air holes in dielectric $\epsilon=12.0$ (e.g. Si at 1.55 μm) is consider with lattice constant a and hole radius r=0.35a. The TE modes (in-plane electric field) is analyzed. To visualize diffraction effects, we employ wave-vector diagrams: constant-frequency contours in k-space whose gradient vectors give the group velocities of the photonic modes. Numerical calculations are carried out in a planewave basis by preconditioned conjugate-gradient minimization of the block Rayleigh quotient. A root-finder is used to solve for the exact wavevectors that lead to a given frequency. The results for frequencies throughout the lowest photonic band are shown at 10 in FIG. 1 in which several constant-frequency contours 12 of the first band of a model photonic crystal (shown at the inset 14) are shown in a repeated zone scheme. The frequency values are in units of 2πc/a.

Figure 2A:
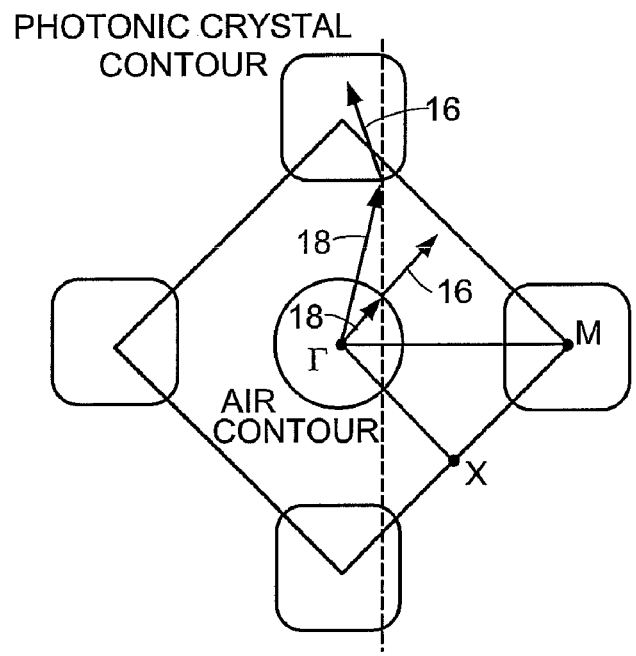
FIG. 2A shows an illustrative diagrammatic view of a portion of the frequency contour of FIG. 1.
Figure 2B:
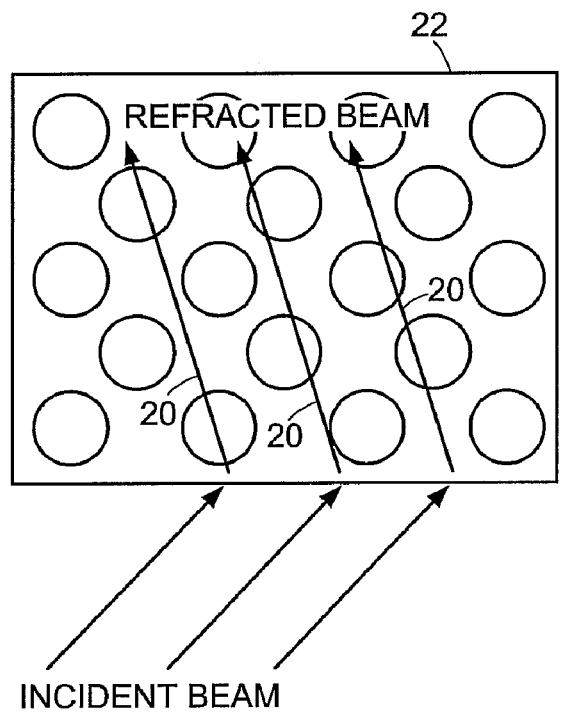
FIG. 2B shows an illustrative diagrammatic view of a refracted field in a photonic crystal in accordance with an embodiment of the invention.

Due to the negative-definite photonic effective mass, $\partial_2\omega/\partial k_i \partial k_j$ at the M point, the frequency contours are convex in the vicinity of M and have inward-pointing group velocities. For frequencies that correspond to all-convex contours, negative refraction occurs as illustrated in FIGS. 2A and 2B. In particular, negative-refracted beams that are constructed from constant-frequency contours are shown in FIG. 2A with conservation of the surface-parallel wave vector. The arrows shown at 16 indicate group-velocity directions, and the arrows shown at 18 indicate phase velocity directions. FIG. 2B shows a diagram of refracted rays 20 in the actual crystal 22. The distinct refracted propagating modes are determined by the conservation of the frequency and of the wavevector component parallel to the air/photonic-crystal surface. If the surface normal is along ΓM [(11) direction], and the contour is everywhere convex, then an incoming planewave from air will couple to a single mode that propagates into this crystal on the negative side of the boundary normal. We have thus realized negative refraction in the first band.

It is clear from this example that neither a negative group velocity nor a negative effective index is a prerequisite for negative refraction. In fact, the lowest band here has $k \cdot \partial \omega / \partial k \geq 0$ everywhere within the first Brillouin zone, meaning that the group velocity is never opposite to the phase velocity. In this sense, we are operating in a regime of positive effective index. In fact, our photonic crystal is behaving much like a uniform, right-handed medium with hyperbolic dispersion relations, such as those induced by anisotropy. For example, the TE modes in a nonmagnetic medium with dielectric tensor $$\bar{\varepsilon} = \begin{pmatrix} \varepsilon_1 & 0 \\ 0 & \varepsilon_2 \end{pmatrix}$$

with $\varepsilon_1 > 0$ and $\varepsilon_2 < 0$ have a dispersion relation $k_2^2/\varepsilon_1 - k_1^2/|\varepsilon_2| = \omega^2/c^2$. Similar negative refraction will then happen on the (01) surface. Again, the phase velocity forms an acute angle with the group velocity.

To realize AANR for superlensing, the required conditions in our model system are that the photonic crystal contours be both convex and larger than the constant-frequency contours for air, i.e., circles with radius $\omega/c$. Incident beams at any incident angle will then experience negative refraction when entering the photonic crystal. Note that single-beam behavior is only possible for $\omega \leq 0.5 \times 2\pi c/a_s$ (where $a_s$ is the surface-parallel period) in order to avoid diffraction. Thus, there are three key criteria that are sufficient for single-beam AANR: (i) The constant-frequency contour of the photonic crystal is all-convex with a negative photonic effective mass; (ii) All incoming wavevectors at such a frequency are included within the constant-frequency contour of the photonic crystal; and (iii) The frequency is below $0.5 \times 2\pi c/a_s$.

Figure 3:
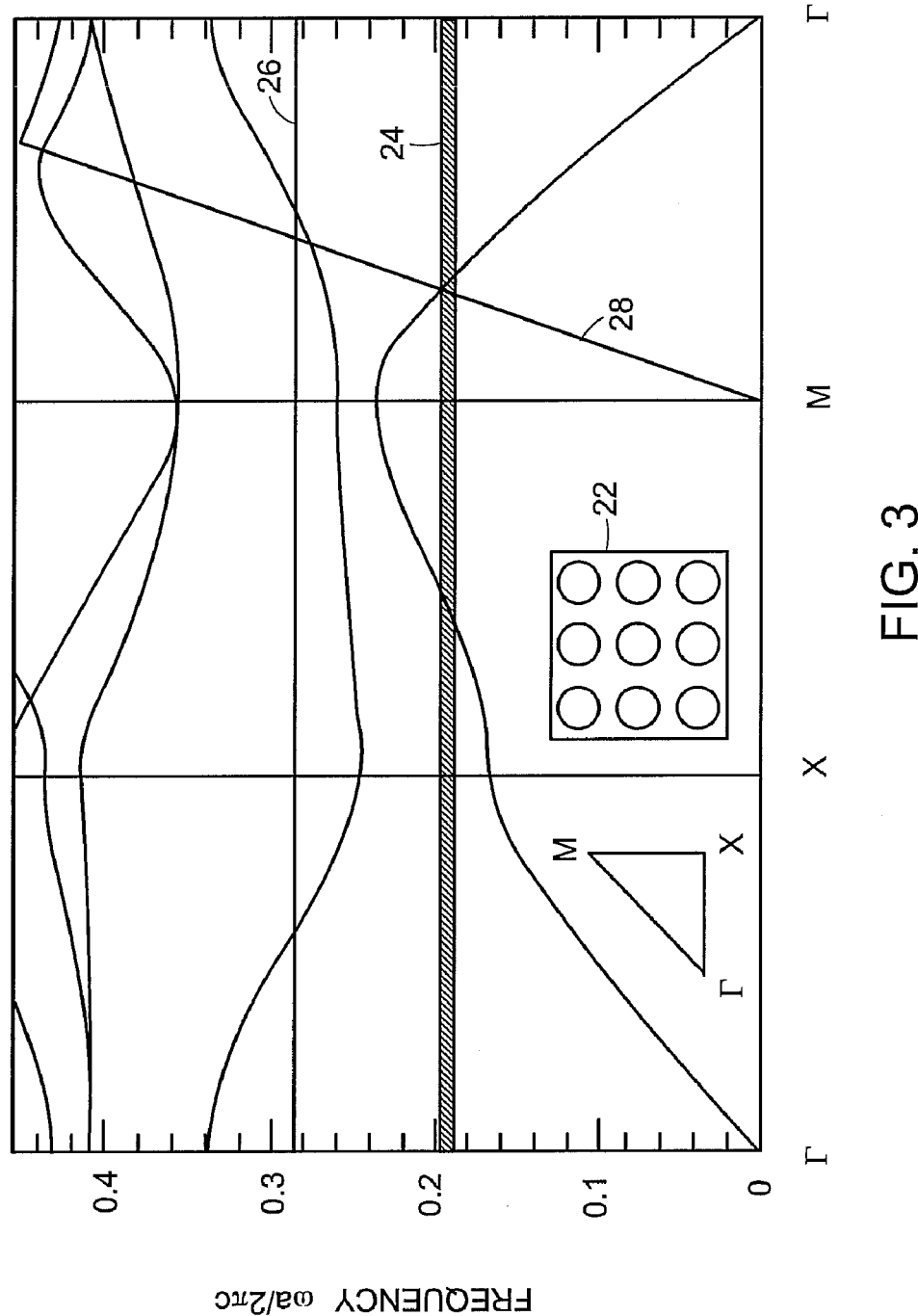
FIG. 3 shows an illustrative diagrammatic view of an AANR frequency profile for a crystal in accordance with an embodiment of the invention.

Using these criteria, we have calculated the AANR frequency range in our model system. We find two regions where AANR is possible, as shown in FIG. 3. These exist in the first and second bands, and correspond to positive and negative effective indices respectively. The lower frequency range has an upper limit $\omega_u = 0.198 \times 2\pi c/a$ that is obtained directly from the band structure by finding the intersection with the light line as depicted in FIG. 3. In particular, the AANR frequency ranges are shown at 24 and 26 in FIG. 3, and the light line shifted to M is shown at 28. We find the lower limit to be $\omega_1 = 0.186 \times 2\pi c/a$, by computing the frequency at which the radius of curvature of the contours along ΓM diverges. This leads to a fractional AANR frequency range of 6.1% around $0.192 \times (2\pi c/a)$. For the second band, we obtain an AANR range of only 0.7% around $0.287 \times (2\pi c/a)$.

To demonstrate how AANR may be put to use, a micro-superlens is designed using the same photonic crystal. Ideally, such a superlens may focus a point source on one side of the lens into a real point image on the other side even for the case of a parallel-sided slab of material. Such a superlens may possess several key advantages over conventional lenses. Due to lack of an optical axis, strict alignment is not necessary. Moreover, flat slabs instead of curved shapes are used and thus fabrication may be easier in principle. A superlens also operates over distances on the order of wavelengths and is an ideal candidate for small-scale integration. Furthermore, AANR for a superlens means that that there is essentially no physical limit on the aperture of this imaging system. Finally, for superlensing at a given configuration and wavelength λ, the resolution of a superlens is expected to be limited by the surface period $a_s$, the characteristic length in our problem. Thus the frequency region of preference, yielding the potentially highest resolution, should correspond to the smallest $a_s/\lambda$. Since typically $a_s \sim a$ and $a/\lambda = \omega a/2\pi c$, this implies that we should choose to operate at the lowest AANR values of $\omega a/2\pi c$ in our band structure.

Figure 4:
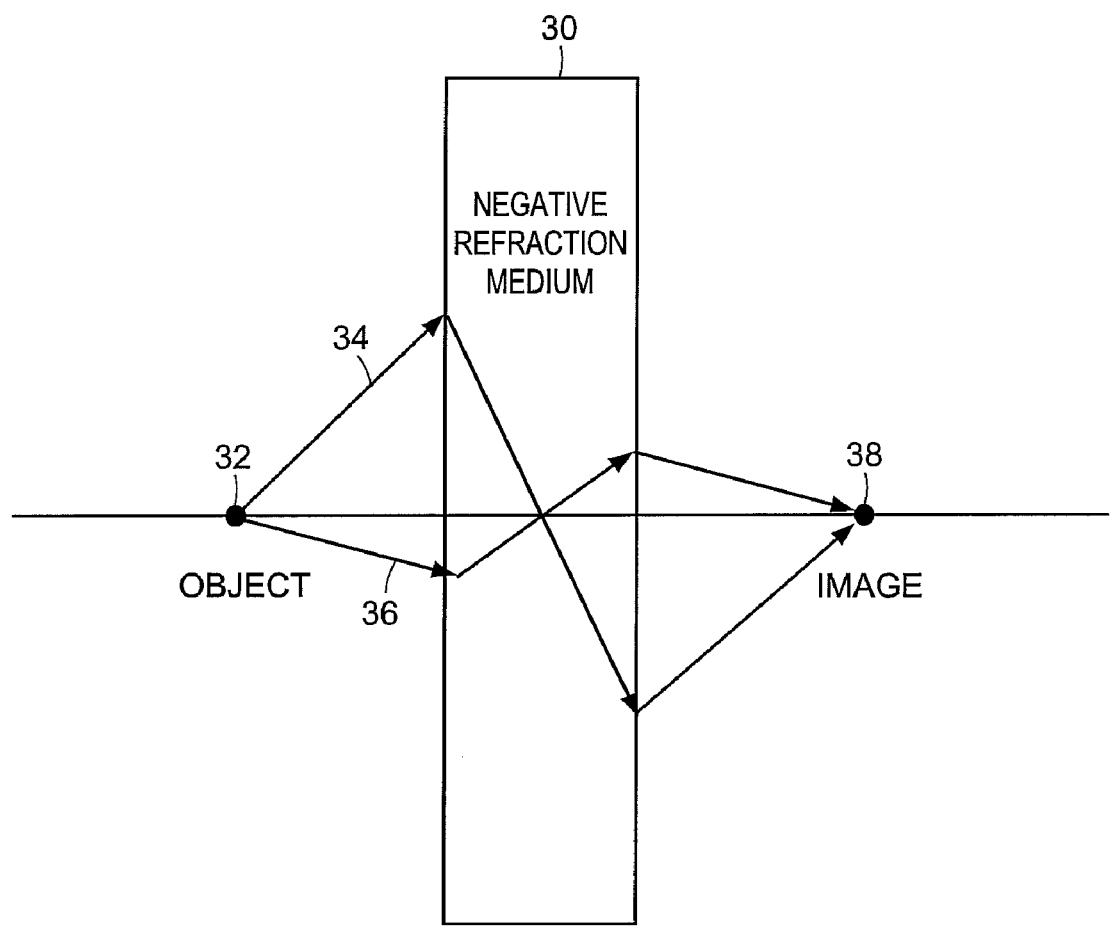
FIG. 4 shows an illustrative diagrammatic view of a superlens system in accordance with an embodiment of the invention.
Figure 5:
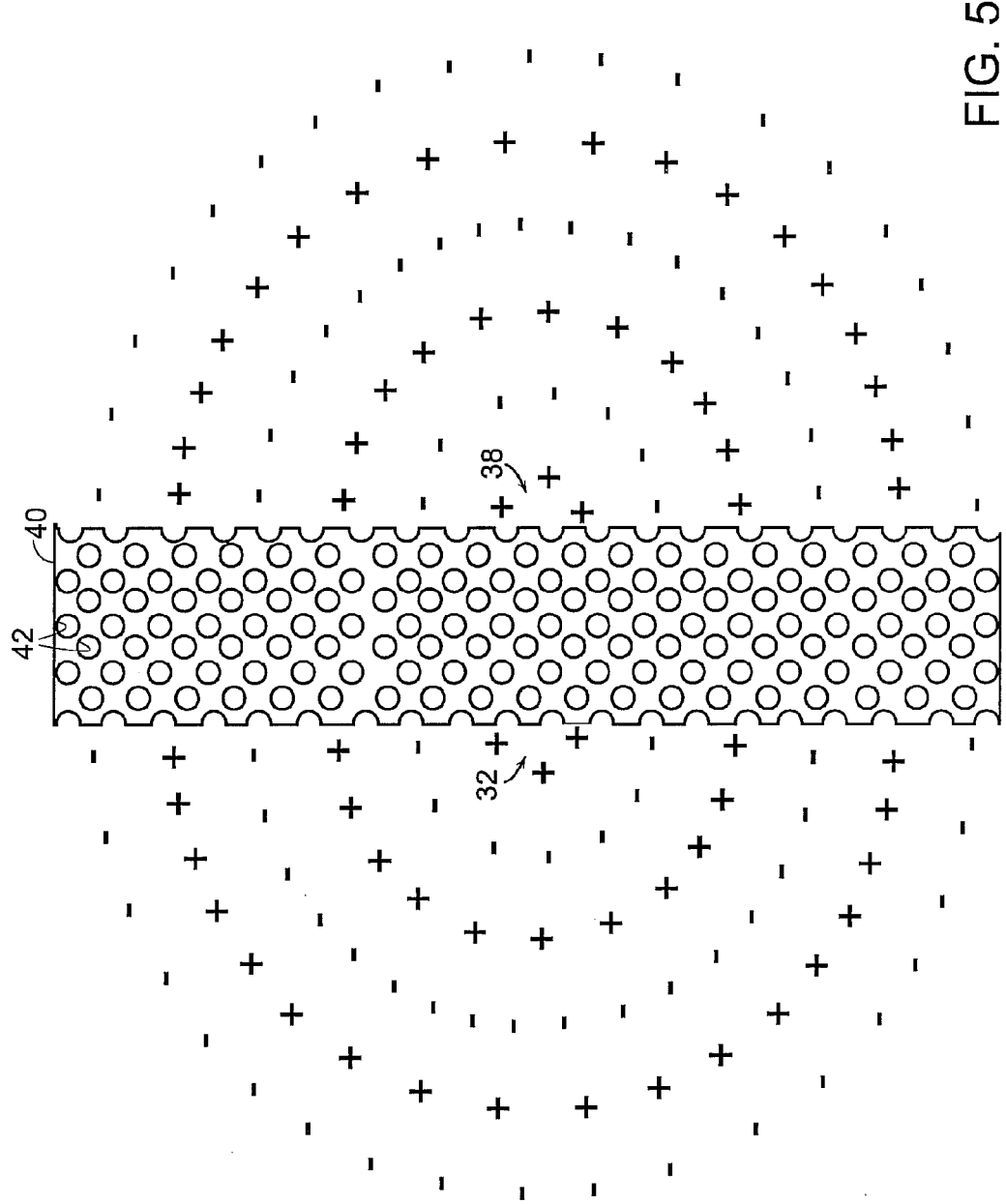
FIGS. 5 and 6 show illustrative diagrammatic views of imaging systems in accordance with further embodiments of the invention.
Figure 6:
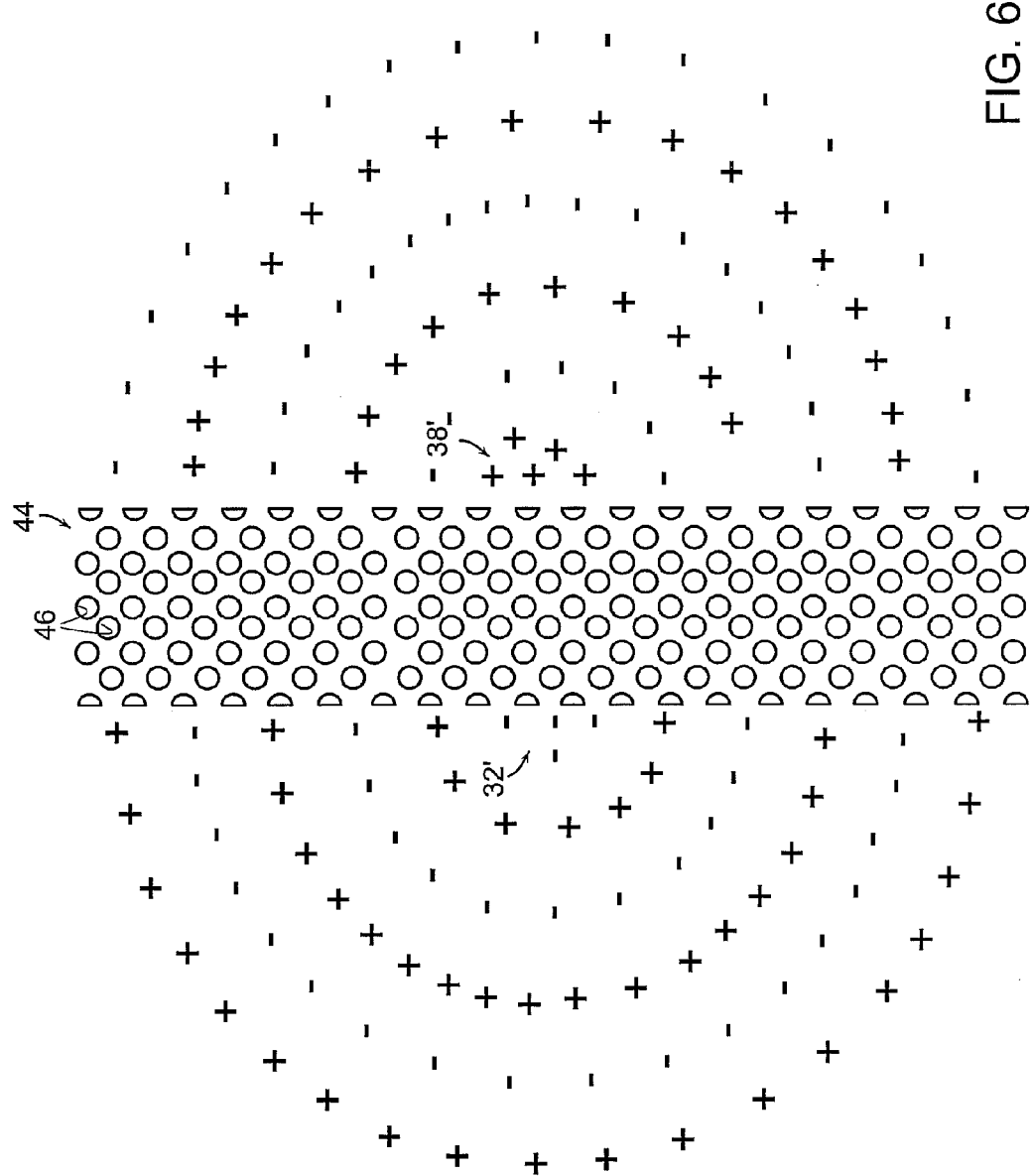

As shown in FIG. 4, an ideal superlens imaging system may include a slab of negative refraction material 30 such that radiation from an object 32 (as shown for example at 34 and 36) is focused at a focal point 38 to create an image. In order to model such a superlens, finite-difference time-domain (FDTD) simulations may be performed with perfectly matched layer (PML) boundary conditions on a parallel-sided (11)-oriented slab of our photonic crystal as shown in FIGS. 5 and 6 in which snapshots of the field pattern for a CW point source placed at a distance 0.35a from the left-hand surface of two different crystals are shown. In particular, FIG. 5 shows a snapshot of $H_z$ distribution of a superlens imaging system including object illumination 32, a photonic crystal 40 that includes air holes 42 as shown, and an image 38, and FIG. 6 shows a snapshot of $E_z$ distribution of a superlens imaging system including object illumination 32', a photonic crystal 44 that includes an array of rods 46 as shown and an image 38'. The frequency is $0.195 \times (2\pi c/a)$, chosen to lie within the lowest AANR frequency range. Note the formation of a point-like image on the right-hand side of the superlens at a distance of ~0.38a. Moreover, even though $a_s = \sqrt{2}a$ in this case, the frequency is low enough that we obtain a transverse size of only 0.67 λ. Although small aberrations are visible in the field pattern, the simulation clearly demonstrates the superlensing effect of this photonic crystal. A similar calculation in the second band AANR region for a slab oriented along (10) with $a_s = a$ also gives a focused image. Even though $a_s/a$ is smaller now, the image turns out to have a larger transverse size 0.76λ, in accordance with the fact that lower frequencies in the band structure offer better superlensing resolution. For both cases the thickness and surface-termination of our slab in the simulation are chosen to minimize reflections. This is accomplished by requiring a slab to possess both mirror symmetry and a thickness equal to an integer multiple of half the wavelength in the slab. Normal-incident transmission through the slab then reaches a resonance maximum for the source frequency and stays above 99% for a range of incident angles of typically at least ±40°. The slab thickness also determines the maximum object distance from the left-hand face that can lead to a good image at a given frequency: the ray-crossing point induced by negative refraction must lie within the superlens. In general, thicker slabs will be able to focus more distant objects.

The preceding discussion focused on the TE modes of a holes-in-dielectric structure. However, based on the general criteria presented here one can obtain single-beam AANR for TM modes (in-plane magnetic field) as well. For TM modes in a similar holes-in-dielectric system with $\varepsilon = 12$, one can obtain a narrow AANR range of width 0.6% around $0.20 \times (2\pi c/a)$ by increasing the hole radii to $r = 0.45a$. Alternatively, if a rods-in-air structure is used with dielectric-rod radii r=0.3a and the dielectric constant is increased to 14 (e.g. a mixture of glass spheres and alumina flake, at microwave length scales), the TM modes can have a larger AANR range of about 3.5% near 0.192×(2πc/a). Further increasing the dielectric constant in this structure with the same rod radii to $\epsilon$=18, e.g. that of Ge at 1.55 μm, could widen the AANR frequency range to 5.2% around 0.172×(2πc/a). The FDTD simulations have also been performed for the rods-in-air structure with $\epsilon$=14 and r=0.3a, and the result is shown FIG. 6. The superlensing phenomenon is again clearly discernable. In this case, however, the reflectivity off the left-hand surface is somewhat higher than in FIG. 5, and there are stronger aberrations in the field pattern. Note that it also happens that here the source and the image are roughly π out of phase. In general arbitrary phase shifts are possible and may be chosen by design.

The above analysis has focused on two-dimensional photonic crystals. A photonic crystal that has a large range of effective negative refractive index in three dimensions, may be demonstrated by numerical simulations as detailed below. With slight modifications, our design is also amenable to layer-by-layer fabrication. This work should enable experimental observation of negative refraction and related phenomena in three-dimensions at optical frequencies.

Figure 7:
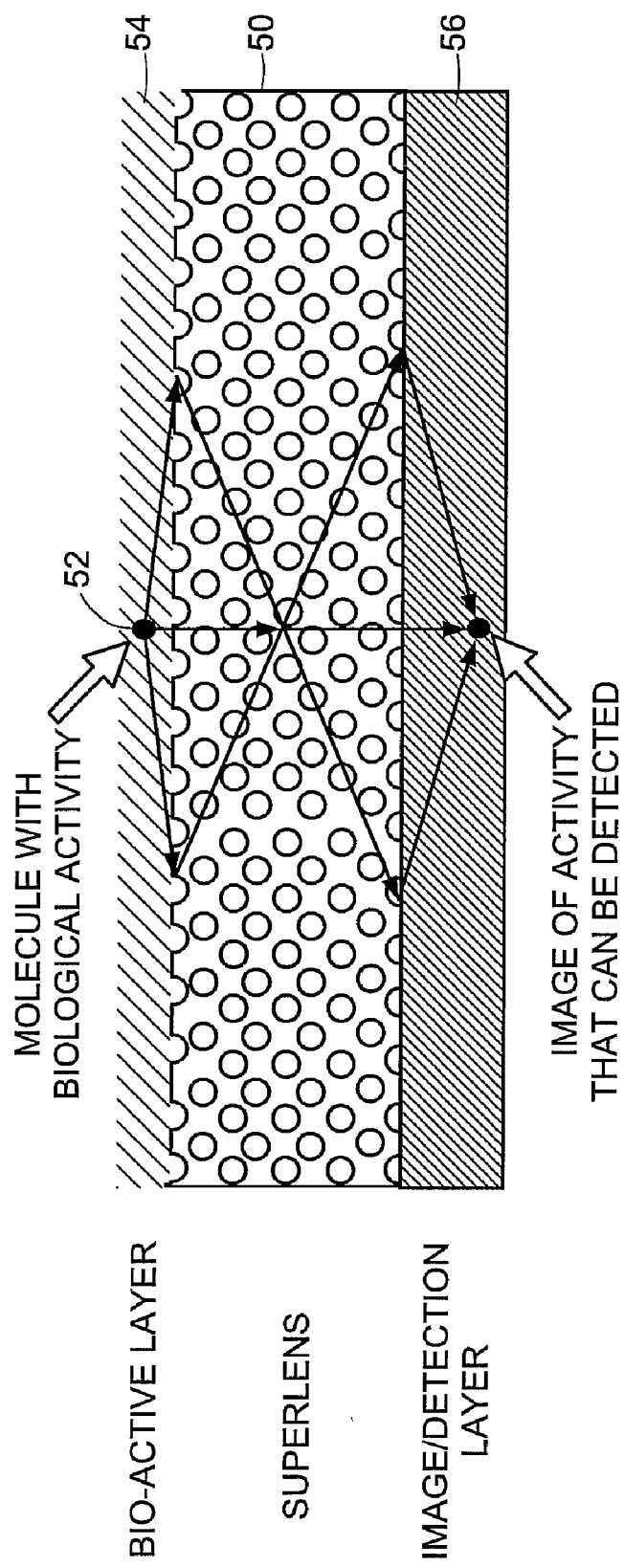
FIG. 7 shows an illustrative diagrammatic view of a biological sample imaging system in accordance with an embodiment of the invention.
Figure 8:
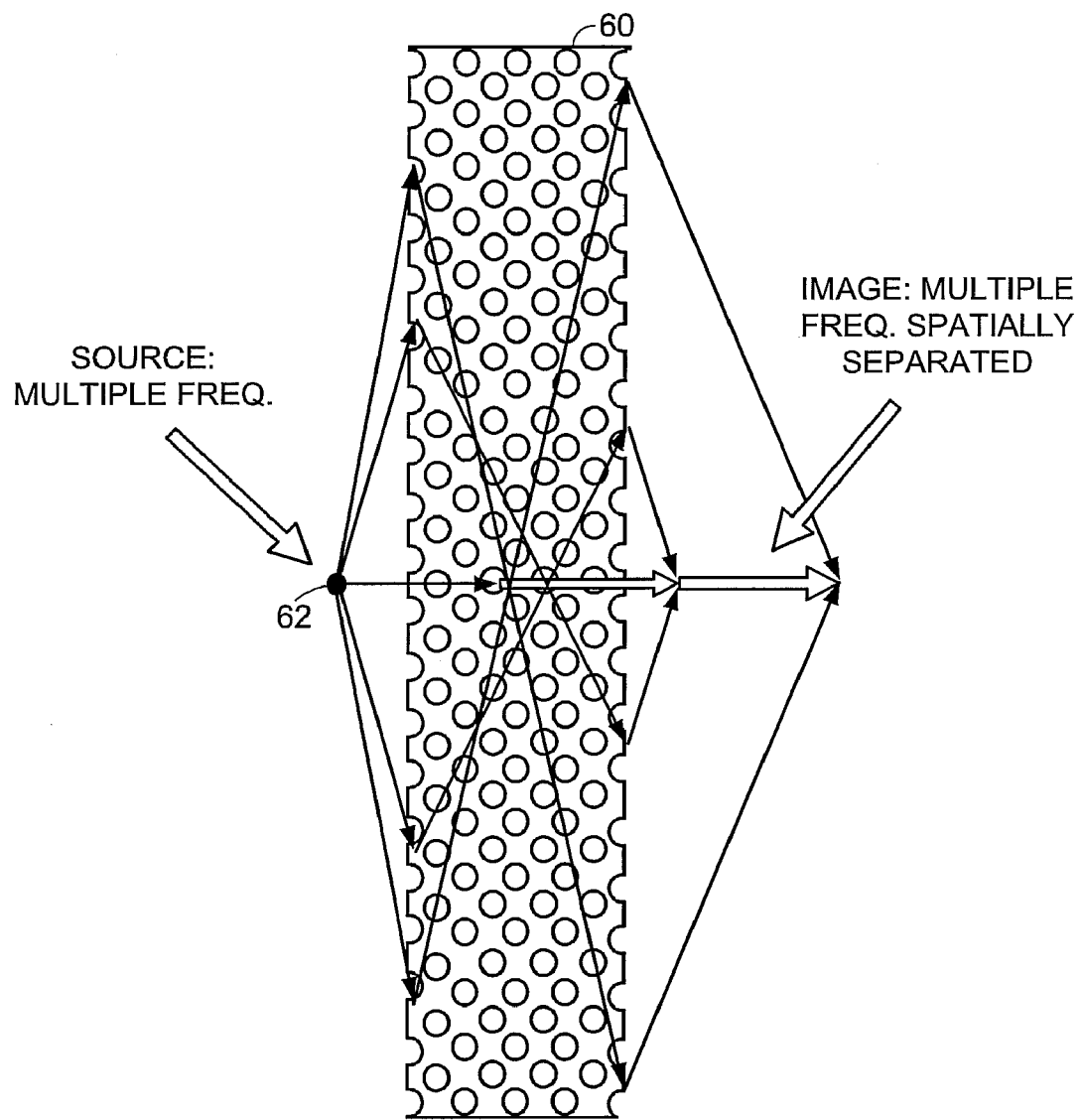
FIG. 8 shows an illustrative diagrammatic view of a color frequency de-multiplexer in using a photonic crystal in accordance with an embodiment of the invention.
Figure 9:
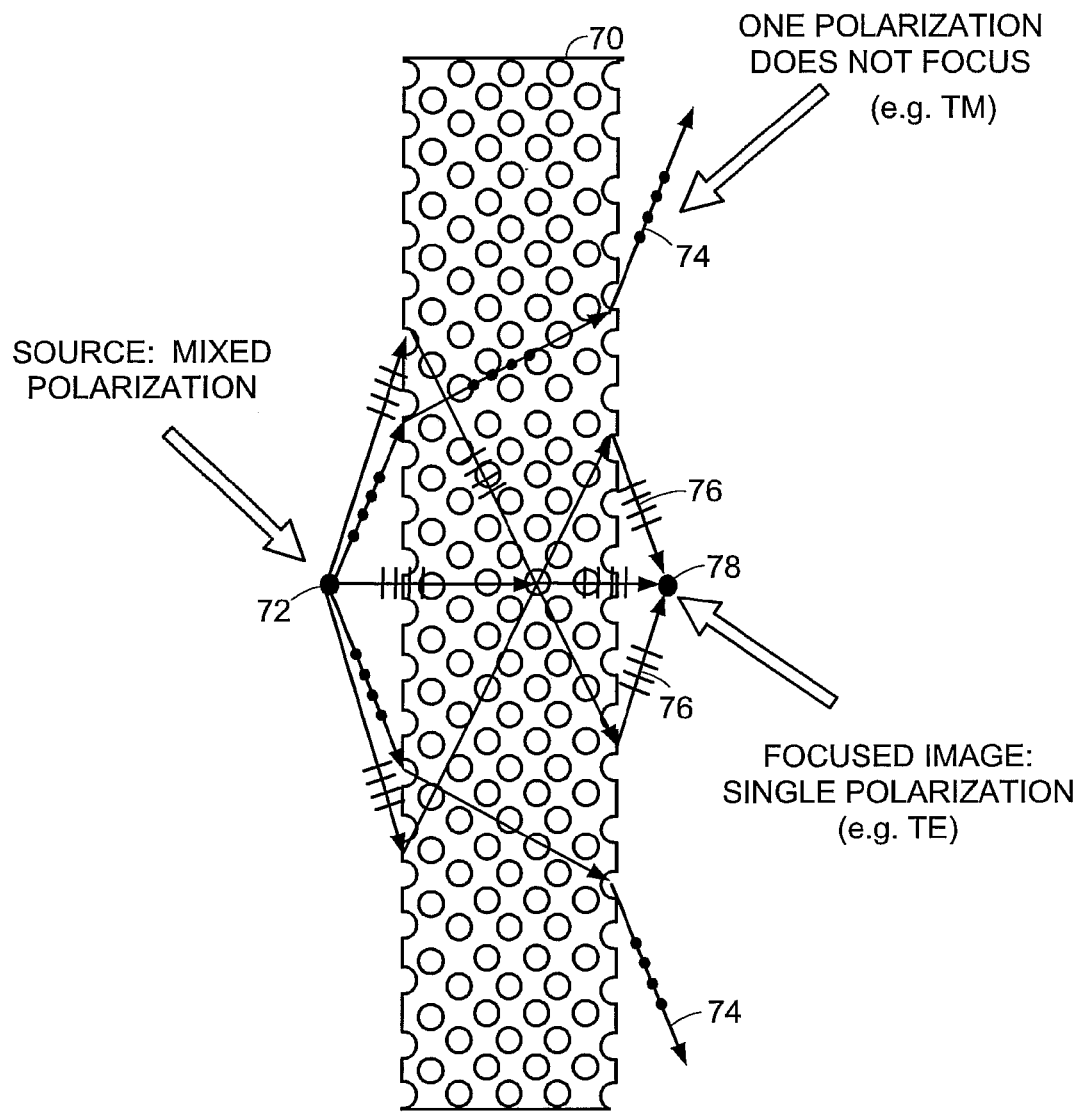
FIG. 9 shows an illustrative diagrammatic view of a polarization sensitive imaging system using a photonic crystal in accordance with an embodiment of the invention.
Figure 10:
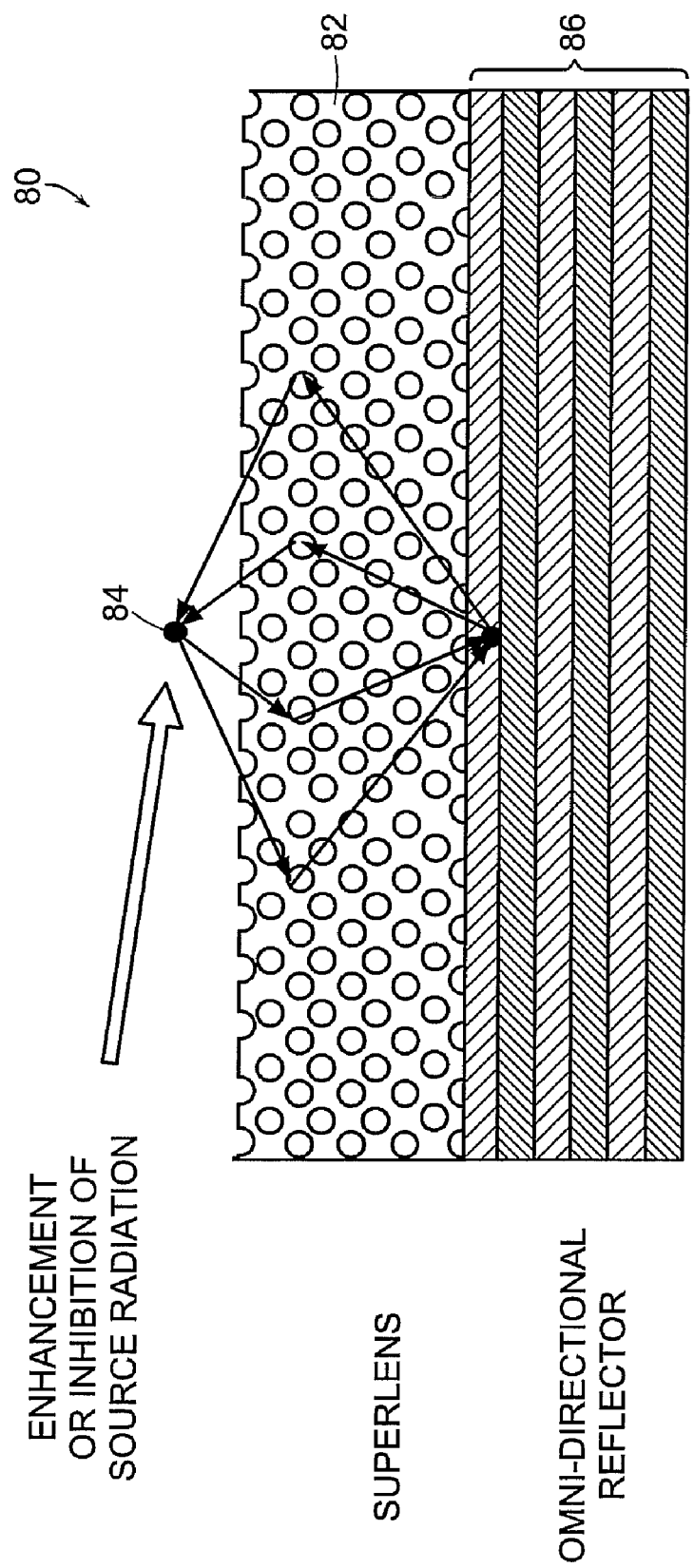
FIG. 10 shows an illustrative diagrammatic view of a radiation enhancement or inhibition system using a photonic crystal in accordance with an embodiment of the invention.
Figure 11:
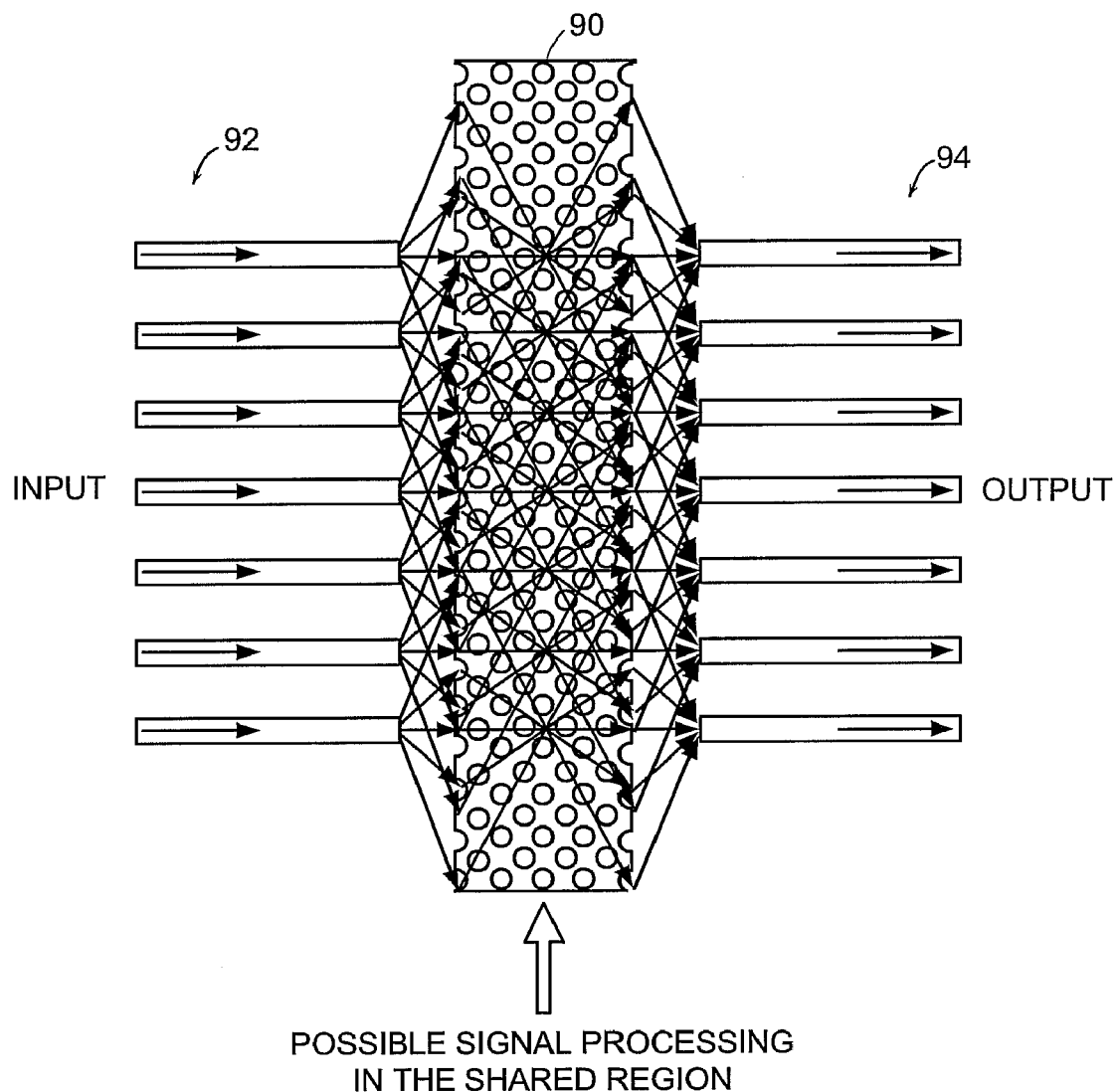
FIG. 11 shows an illustrative diagrammatic view of a signal processing system using a photonic crystal in accordance with an embodiment of the invention.

In other embodiments, a superlens 50 of the invention may be used to image a molecule 52 with biological activity as shown in FIG. 7. The system may include a bio-active layer 54, the superlens 50 and an image detection layer 56 within which an image of the activity may be detected. Note that the focal spot size may be very short as discussed in further detail below. As shown in FIG. 8, a photonic crystal 60 of the invention may be used in a frequency separator system that receives a multi-frequency input source 62 and produces a multi-frequency spatially separated image at the focal planes for each frequency. As shown in FIG. 9, a photonic crystal 70 in accordance with another embodiment of the invention may be used as a special type of polarization filer that receives mixed polarization fields at a source 72. Certain of the polarization fields 74 (e.g., TM) diverges and is not focused, while other polarization fields 76 (e.g., TE) are focused at the focal point 78. A photonic crystal of another embodiment of the invention may be used with a device that enhances or inhibits radiation on an open structure as shown at 80 in FIG. 10. The system includes a superlens 82 that receives radiation from a source 84 as well as an omni-directional reflector 86 that returns the radiation to the source 84 as the focal point. In other embodiments, the a photonic crystal 90 of the invention may be employed in a signal processing system as show in FIG. 11 that simultaneously focuses multiple waveguide channels 92 that are coupled to multiple waveguide outputs 94.

In further embodiments, a three-dimensionally periodic photonic crystal may be developed to fully enable three-dimensional negative refraction. This is a nontrivial problem, however, since the bandstructure of three-dimensional photonic crystals is considerably more complicated than that of their two-dimensional counterparts. In particular, the photonic modes along an arbitrary direction are no longer polarized, the photonic band gaps are more rare, and there is usually more than one band at a single frequency. As a result, several outgoing beams can emerge from a single refraction process, and the description in two-dimensions in terms of an effective negative refractive index becomes difficult.

A three-dimensional photonic crystal may be created with a large frequency range in which the effective negative-index concept is still valid. Again, the possibility of AANR, i.e., negative refraction for beams of all incident angles from air, is discussed. This is the case of practical interest because AANR precludes modes with very small group velocities that are close to band edges and are generally difficult to couple to from an external planewave. Moreover, AANR also eliminates the effect of total external reflection that exists for some angles if the absolute value of the effective index is less than unity and might be undesirable in some applications. Similar to the discussion above for two-dimensional crystals, to realize AANR sufficient criteria are that the frequency range be near a negative photonic-mass region in the bandstructure and below the diffraction threshold, and the photonic-crystal constant-frequency contour be all-convex and larger than that of air. Clearly, this is only possible in the first few bands. In addition, as described in more detail below, care must be taken above the first two bands to ensure that the symmetry of the photonic modes allows good coupling from external planewaves.

The geometric lattice of the three-dimensional photonic crystal may be determined from the following intuitive argument. In the periodic zone scheme, the constant-frequency contour for the first few bands of the photonic crystal can be constructed by joining all the spherical contours of an effective uniform medium which are centered on the reciprocal lattice sites and rounding the sharp parts of the joint surface across Brillouin zone boundaries. For a given Brillouin zone corner C, we expect that the more neighboring reciprocal-lattice sites C has, the stronger the resulting rounding effect and the easier it is for the constant-frequency contours to become all-convex around C. Thus, a rough rule to choose the geometric lattice for AANR is just to maximize the number N of C's nearest-neighbor reciprocal-lattice sites. If AANR is to be realized in the fundamental (i.e., the first two) bands, then C is a corner of the first Brillouin zone. In this case, a simple-cubic (SC) reciprocal lattice with N=8 should be used, resulting in a SC photonic crystal with (111) surface termination. If AANR is to be realized in the bands after folding once, then C is a corner of the second Brillouin zone, which in most lattices is just Γ after translation of a reciprocal-lattice vector. This is the usual effective negative-index situation, and the Face-Centered Cubic (FCC) reciprocal lattice which has N=12 should be chosen, giving a Body-Centered Cubic (BCC) structure in real space. We will focus on the case of N=12 below, and will demonstrate, through bandstructure calculations and numerical simulations, that a BCC photonic crystal with (101) surface termination is a good candidate for achieving AANR.

Figure 12:
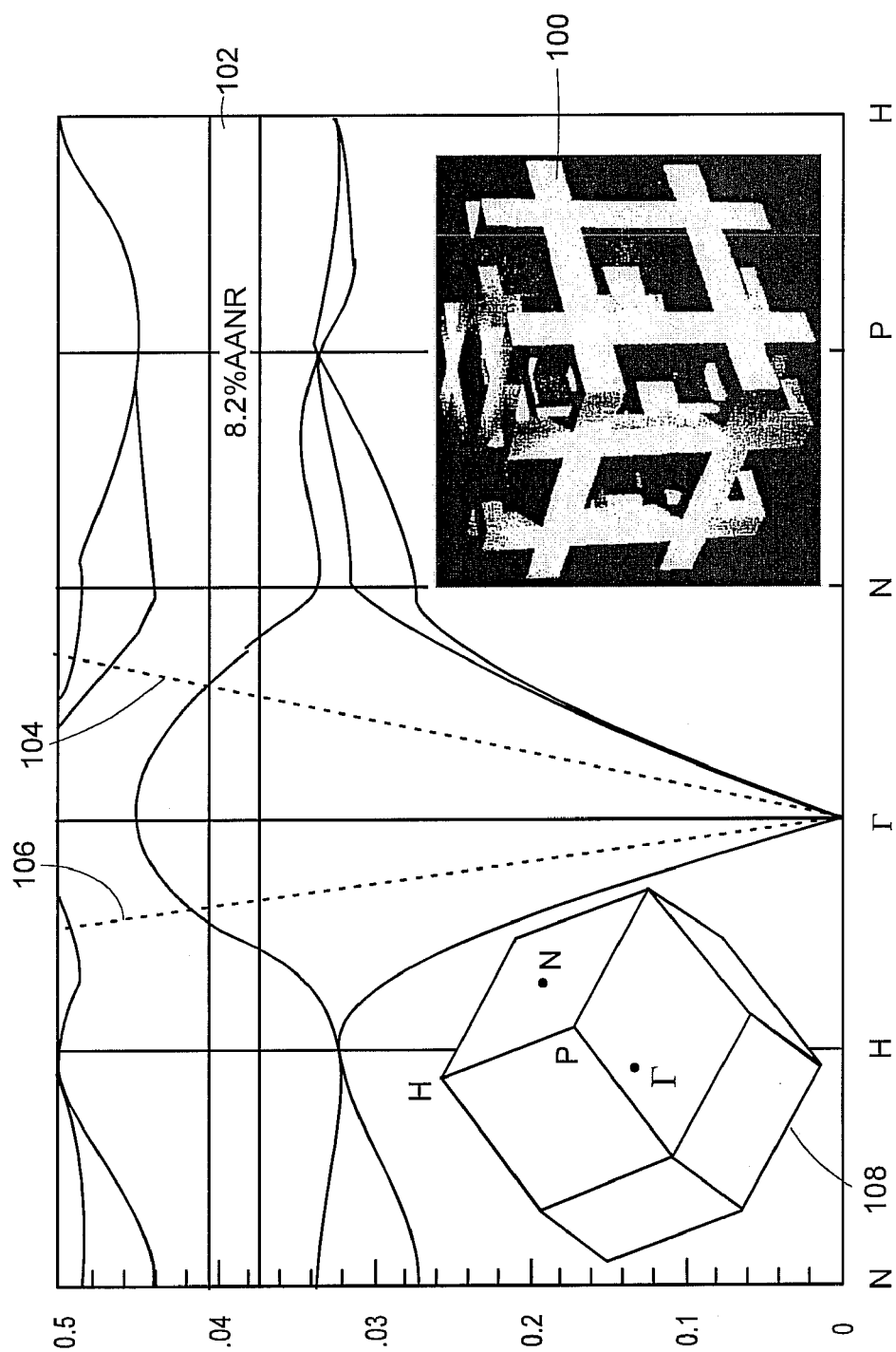
FIG. 12 shows an illustrative diagrammatic view of a frequency band structure of a photonic crystal in accordance with another embodiment of the invention.
Figure 13:
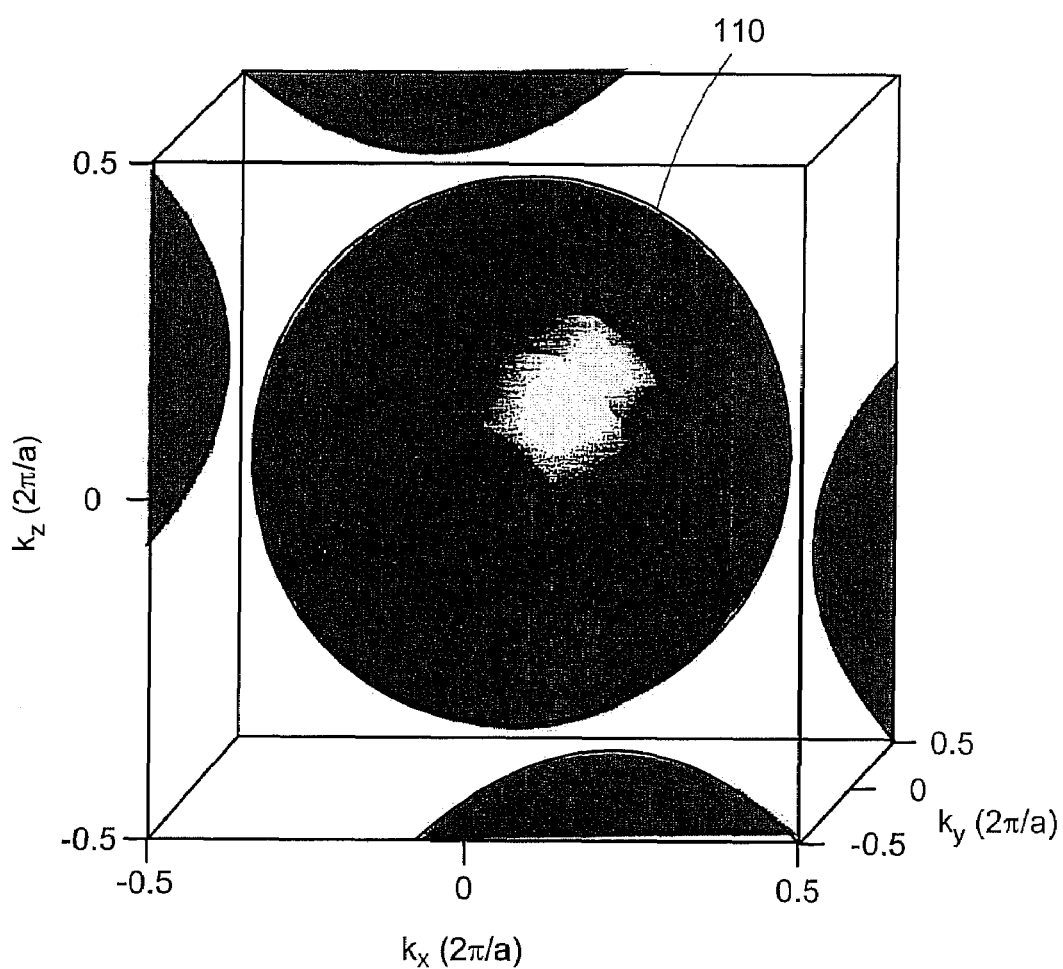
FIG. 13 shows an illustrative diagrammatic view of a constant-frequency contour of a photonic crystal in accordance with a further embodiment of the invention.

The proposed structure consists of a bcc lattice of air cubes in dielectric $\epsilon$=18.0 (e.g. Ge at λ=1.55 μm). The sides of the air cubes have length 0.75a and are parallel to the sides of the conventional BCC cell, whose length is taken to be a. The band structure of this photonic crystal is shown in FIG. 12 in which the photonic crystal includes a BCC lattice of air cubes in dielectric $\epsilon$=18 as shown at 100. The cubes have sides 0.75a and are oriented with sides parallel to those of the conventional bcc cell. A large AANR frequency range of 8.2% is indicated at 102, from 0.375(2πc/a) to 0.407(2πc/a) in the third band. The dashed lines as indicated at 104 and 106 are light lines along ΓH and ΓN. The shape and special symmetry vertices of the first Brillouin zone are shown at 108. Within the AANR frequency range, the constant-frequency contour of the photonic crystal forms a single all-convex surface which is larger than that of air. In particular, the constant-frequency contour at ω=0.407(2/πc/a) is shown at 110 in FIG. 13 in a repeated zone scheme. The contour 110 is nearly spherical with radius ω/c. In terms of the effective refractive index $n_{eff}$ in three-dimensions, the photonic crystal at this frequency may be regarded as $n_{eff} \approx -1$, and the AANR frequency region corresponds to $n_{eff} \leq -1$. Of course, $-1 < n_{eff} < 0$ also holds true for the frequency region above $0.407(2\pi c/a)$ and below the fourth band. We also note that a complete photonic bandgap between the third and the fourth bands may result if larger cubes are used, however, a complete photonic bandgap is not required.

Because there is only one band in the frequency range of effective negative index, we expect that the negative-refraction phenomena in this frequency range will be strongly polarization dependent. In particular, the (001) surface should not be used for negative refraction. This is because, along the (001) direction, the two degenerate polarizations of normal-incidence radiation and the singly-degenerate photonic crystal mode belong to different irreducible representations of the surface symmetry group of the photonic crystal. As a consequence, they do not couple to each other. On the other hand, if we consider the (101) direction, then the two polarizations are no longer degenerate, and one of them can couple to the photonic crystal mode. In this case, it is waves polarized along (101) that couple strongly to the photonic crystal mode. For the other polarization along (010), the coupling efficiency is 0 at normal incidence and very weak at nonzero incident angles. In summary, the negative-index behavior in our photonic crystal applies most effectively on the (101) surface for the (101) polarization. This dependence of coupling efficiency on surface termination and polarization direction is an important difference between photonic crystals of certain embodiments of the invention and an isotropic, uniform medium with negative refractive index.

Figure 14A:
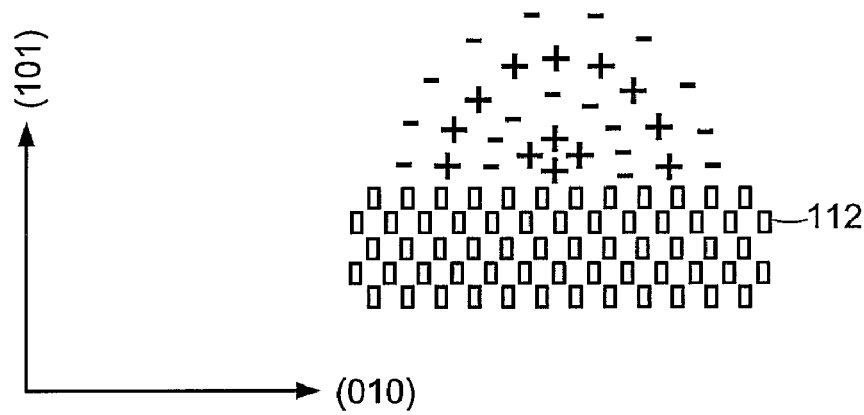
FIGS. 14A-14C, 15A-15C, 16A-16C and 17A-17C show illustrative diagrammatic views of stages of fields passing through photonic crystals in accordance with various embodiments of the invention.
Figure 14B:
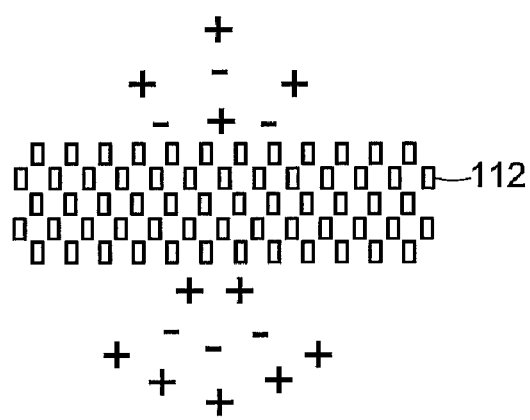
Figure 14C:
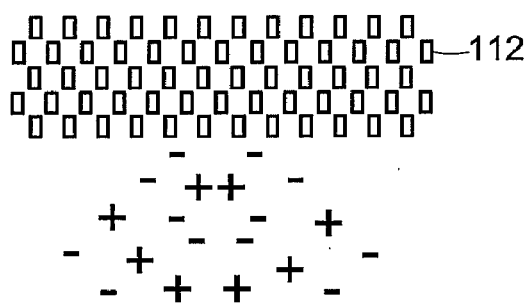
Figure 15A:
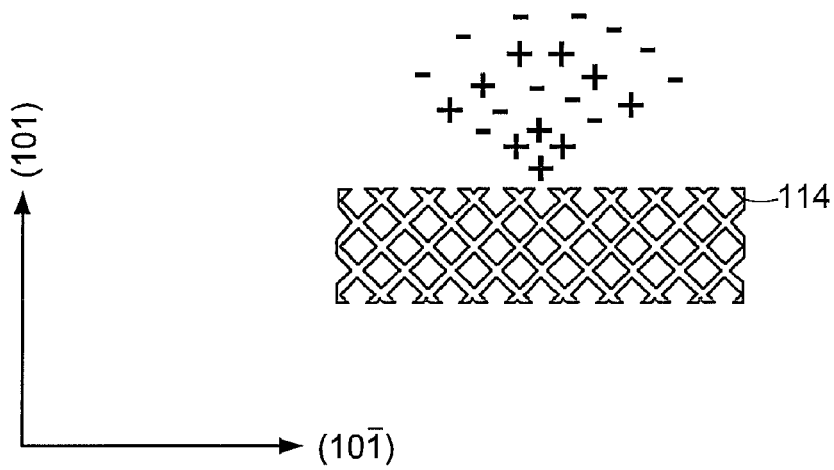
Figure 15B:
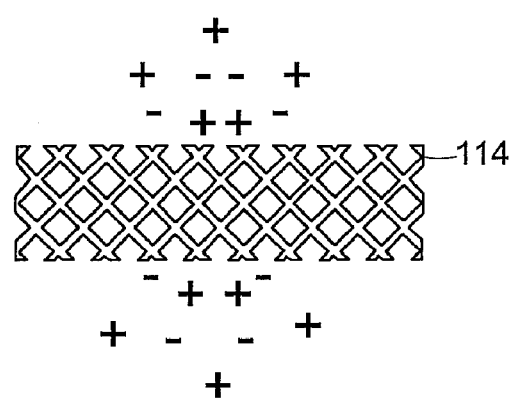
Figure 15C:
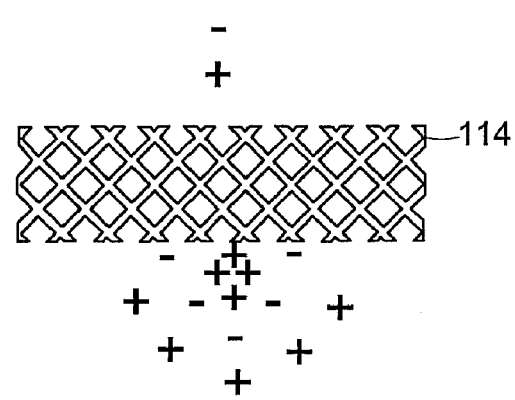
Figure 16A:
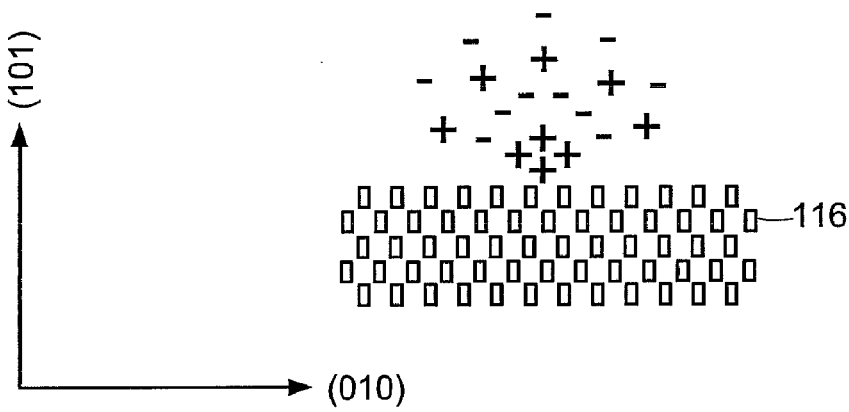
Figure 16B:
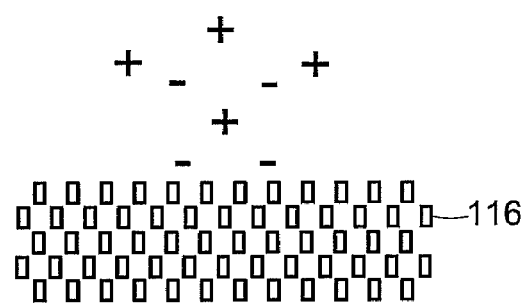
Figure 16C:
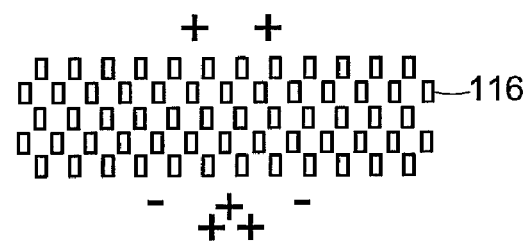
Figure 17A:
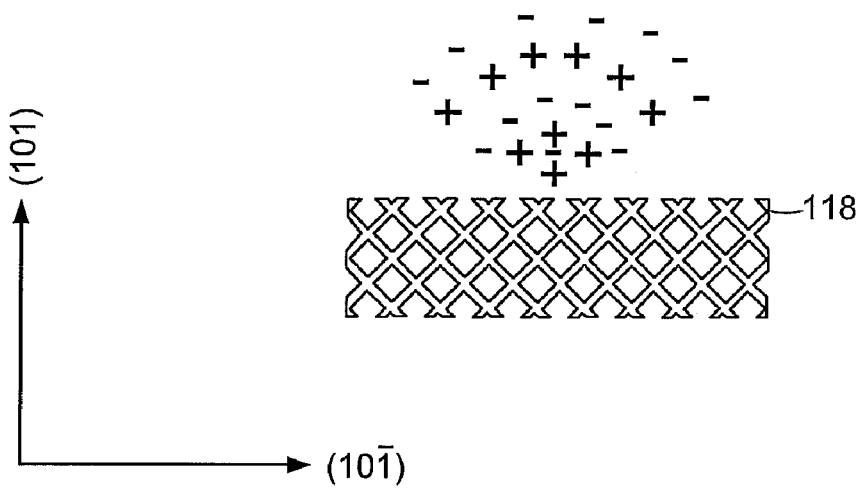
Figure 17B:
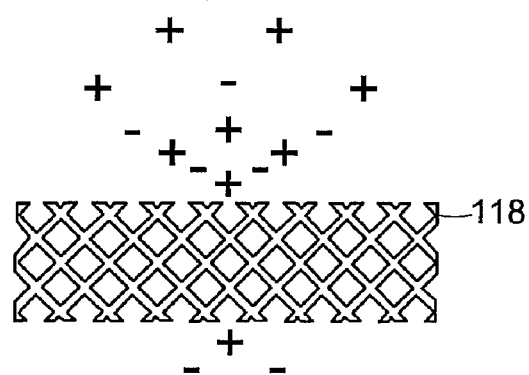
Figure 17C:
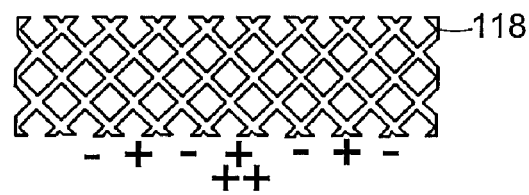

To demonstrate AANR in three-dimensions and to illustrate the polarization dependence, finite-FDTD numerical simulations were performed with perfectly matched layer boundary regions on a finite slab of our photonic crystal with (101) surface termination to realize superlensing. For convenience, a rotated coordinate system is employed so that the x axis is along (10$\bar{1}$), the y axis is along (010) and the z axis is along (101) direction of the crystal. A pulsed point-dipole source of center frequency $0.39(2\pi c/a)$ is excited at a distance of 0.72a above the top surface of the photonic crystal, and observe the radiation field distribution as a function of time. In FIGS. 14A-14C and 15A-15C we show the results when the dipole is pointing along the (10$\bar{1}$) direction. In particular, FIGS. 14 and 15 show two-dimensional snapshots of the electric field along the (10$\bar{1}$) direction during an FDTD simulation of negative refraction of a (10$\bar{1}$) pointing pulsed dipole source. The positive and negative field values are shown for the (010)-(101) plane of the crystal 112 in FIG. 14, and for the (101)-(10$\bar{1}$) plane of the crystal 114 in FIG. 15. FIGS. 14A and 15A are taken when the dipole reaches its peak, FIGS. 14B and 15B are taken at an intermediate time, and FIGS. 14C and 15C are taken at the instant when the image roughly reaches its peak. The simulation shows that a significant fraction (roughly 27% out of a possible 50%) of the total dipole radiation transmits through the photonic crystal slab and become refocused into a wavelength-sized image below the slab. Since the focusing effect may be observed from both planes, it clearly demonstrates the fully three-dimensional negative-refraction effect. There are some reflections from the photonic crystal visible here, but this is largely due to finite bandwidth spread of the pulse source. In principle, an appropriate width of the photonic crystal slab may be chosen to minimize reflections at one frequency. On the other hand, if the dipole is pointing along (010), then most of the radiation fields are reflected. This is shown in FIGS. 16 and 17 of an electric field along (010) in which dipole source is pointing toward (101). Similarly, the positive and negative field values are shown for the (010)-(101) plane of the crystal 116 in FIG. 16, and for the (101)-(10$\bar{1}$) plane of the crystal 118 in FIG. 17. FIGS. 16A and 17A are taken when the dipole reaches its peak, FIGS. 16B and 17B are taken at an intermediate time, and FIGS. 16C and 17C are taken at the instant when the image roughly reaches its peak. The fraction of power transmitted through the structure is only 3.6% (instead of 27%) and is from other frequency components outside the desired band. Thus, for this polarization the negative refraction effect is rather weak. This strong polarization dependence may be exploited for polarization-sensitive applications.

Figure 18A:
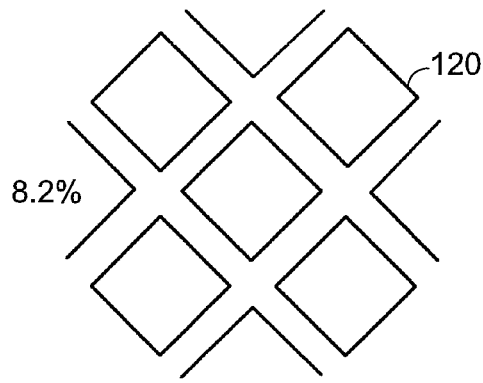
FIGS. 18A-18D show illustrative diagrammatic cross-sectional views of photonic crystals in accordance with various embodiments of the invention.
Figure 18B:
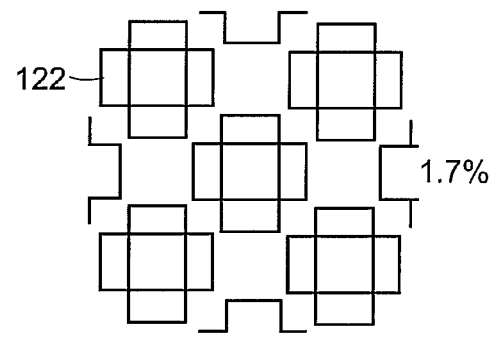
Figure 18C:
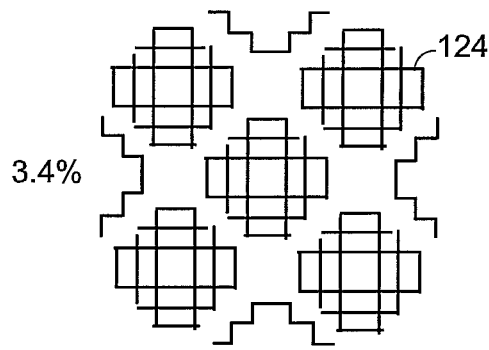
Figure 18D:
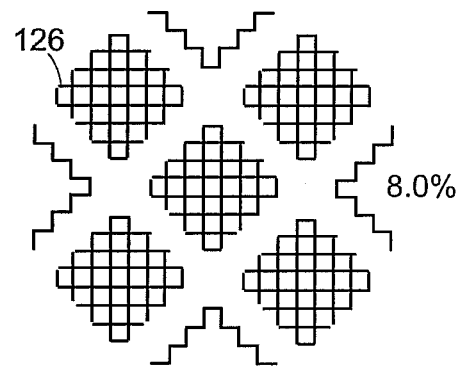

Although we have used $\epsilon=18$ for the high index material in these calculations, in practice other materials can also be used. In particular, Si with $\epsilon=12$ at 1.55 μm yields an AANR frequency range of 3.2% around $0.464(2\pi c/a)$. Of course, low index material may be used in place of air if the overall dielectric contrast is large enough. The fabrication of the photonic crystal in the original design at submicron lengthscales is still a challenging task because this design is not in a layered form in the (101) direction. A simple modification for practical fabrication may be to use an approximate design with stair, structures, as shown in FIGS. 18A-18D. Here, several overlapping block voids 122, 124 and 126 are used to mimick the original design 120. In particular, FIG. 18A shows a cross-section of the original design 120. FIG. 18B shows an approximation of the design 120 by replacing each cubic void with two blocks. FIG. 18C shows an approximation that includes three voids to form the stairs, and FIG. 18D shows an approximation that uses four block voids to approximate the design 120. Each structure may be constructed by etching these block voids on the high-index material layer by layer, in accordance with conventional etching techniques. AANR may still be achieved in these approximate designs, with the frequency ranges sizes shown in FIGS. 18A-18D. In particular, the design shown in FIG. 18D may reproduce roughly the same AANR frequency range size as in the original design. Thus, it should also be possible experimentally to verify the three-dimensional AANR discussed above.

In further embodiments, materials of the invention may be employed to provide subwavelength imaging. The classical diffraction limit for a focused intensity peak is defined to be the distance between the nearest intensity minima around that peak. This distance is greater than one wavelenegth (λ) for all images formed by conventional focusing devices such as a lens. With a superlens formed by a negative-refraction medium as in FIG. 4, it is possible to focus light into a spot at the position of the image with a subwavelength size, i.e. superlensing. In particular, evanescent waves may be transmitted through a slab of photonic crystal at subwavelength resolutions. The amplification of near-field waves in this case rely on resonant coupling mechanisms to surface photon bound states, and the use of negative refractive indices by Pendry is only one of the many possible ways to realize this effect. It has been found that the periodicity of the photonic crystal may impose an upper cutoff to the transverse wavevector of evanescent waves that may be amplified, and thus a photonic crystal superlens is free of divergences even in the lossless case.

Figure 19A:
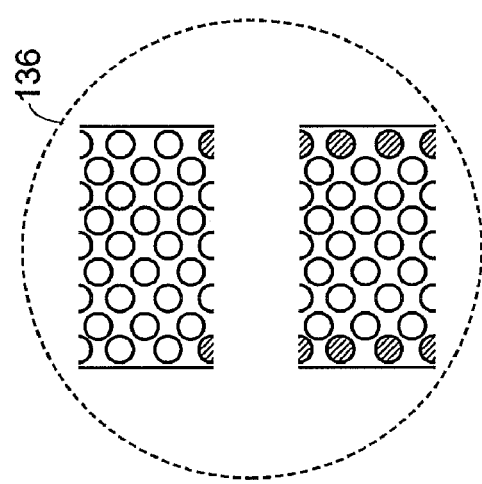
FIG. 19 shows an illustrative diagrammatic graphic view of a frequency band structure in accordance with an embodiment of the invention.
Figure 19:
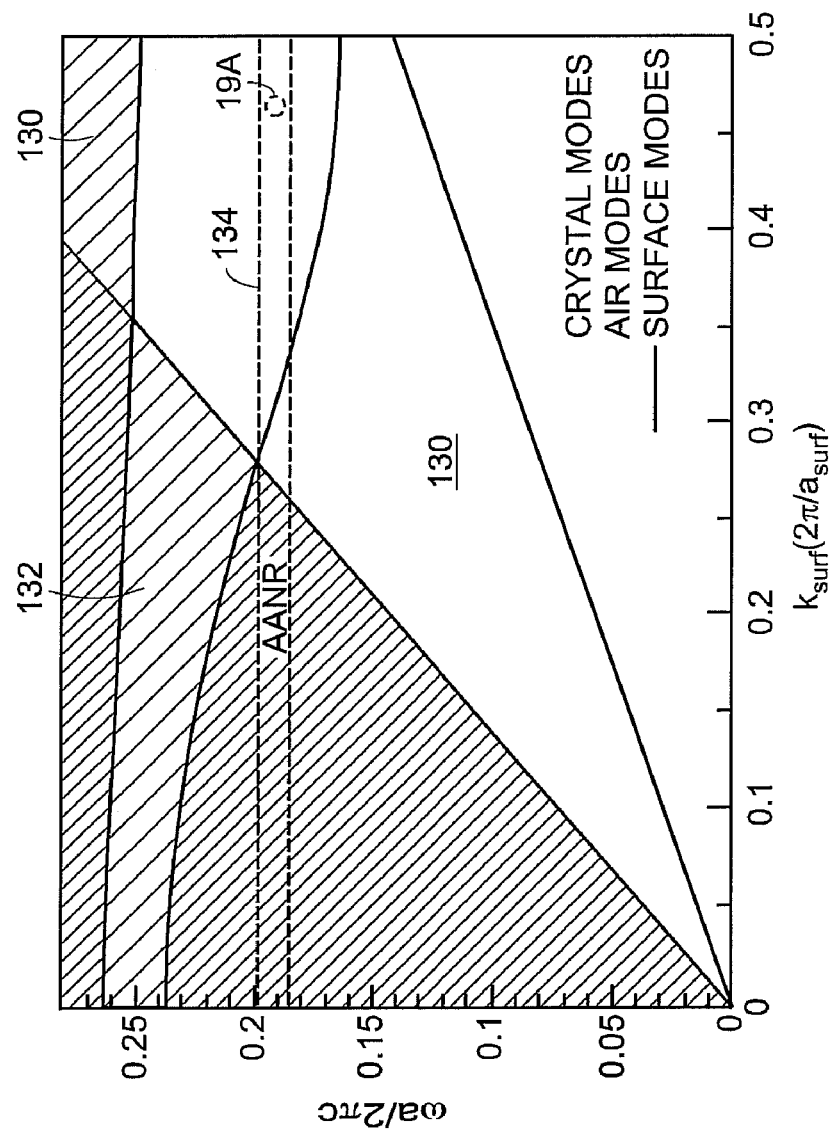

The details of superlensing using dielectric photonic crystals are disclosed in the following example and discussion. In this example, we study a two-dimensional crystal similar to that in FIG. 1 having an AANR frequency range as shown in FIG. 19 in which the crystal modes are shown at 130, the air modes are shown at 132, and the surface modes are shown at 134. The inset 136 shows the surface modes in illustrated detail. A slab of this crystal may be designed by tuning the slab thickness to have two near-degenerate flat surface photon bands near $\omega=0.192(2\pi c/a)$, which may be used to amplify evanescent waves near that frequency. The field profiles of the surface photon bands are also shown in FIG. 19. A point-dipole source is placed at $0.1a_s$ from the slab, and the computational results of image patterns away-from the slab are summarized in FIGS. 20A-20C, 21A-21C, and 22A-22C. In these cases the transmission for propagating waves is nearly the same and close to unity, and the operating frequency is shifted by only 0.001 $(2\pi c/a)$ from one to another. However, large differences in the field patterns for z>0 may be observed in the results, indicating that a fine control over the transmission of evanescent waves is possible.

Figure 20A:
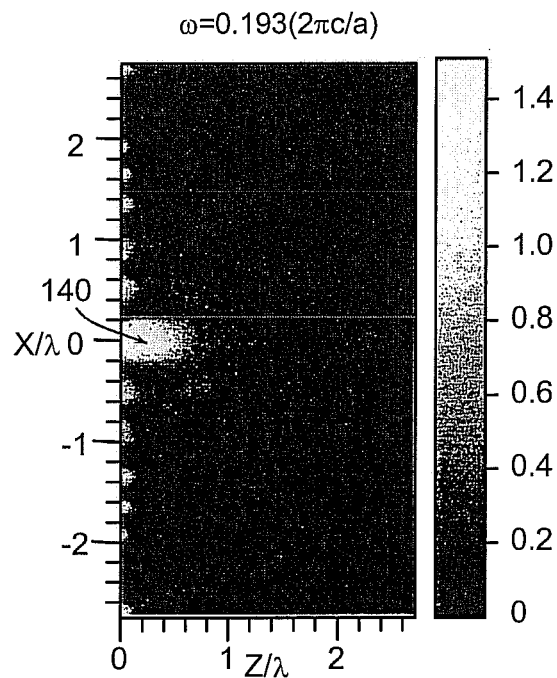
FIGS. 20A-20C, 21A-21C and 22A-22C show illustrative diagrammatic views of intensity profiles and intensity distribution data for systems at different frequencies in accordance with further embodiments of the invention.
Figure 20B:
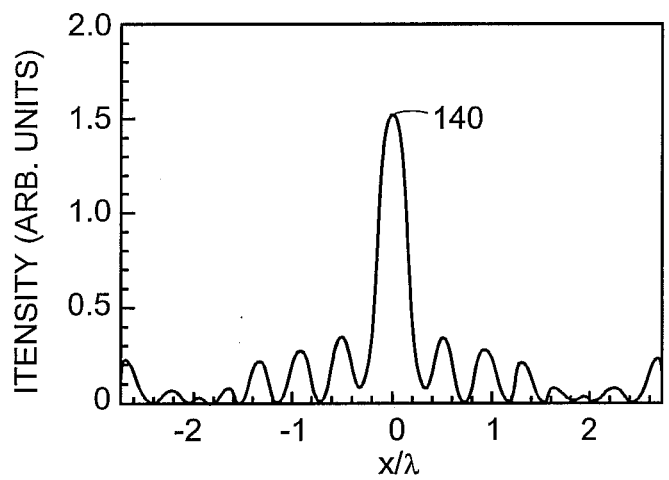
Figure 20C:
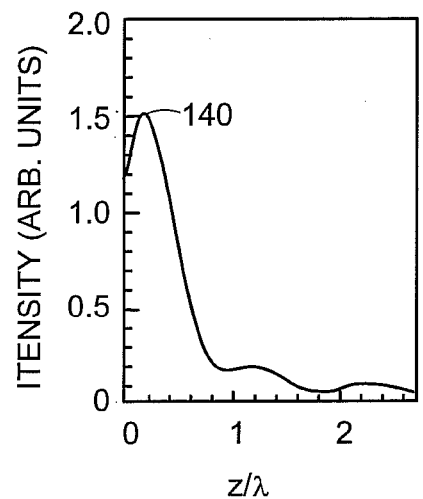
Figure 21A:
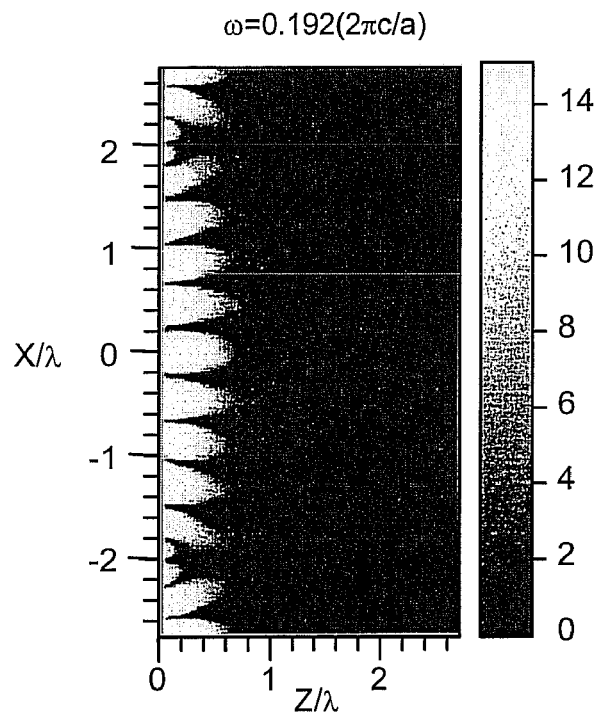
Figure 21B:
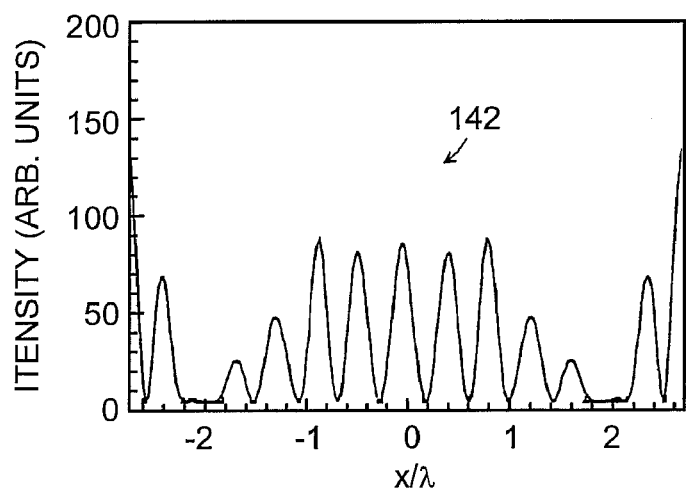
Figure 21C:
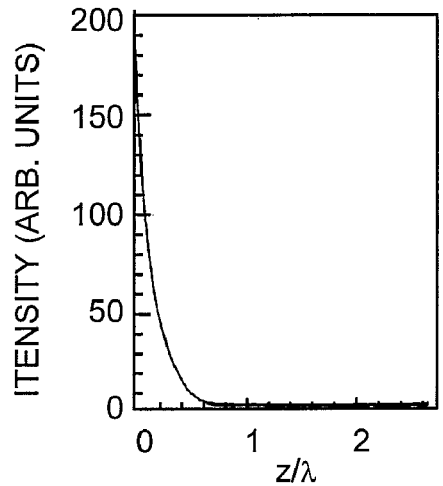
Figure 22A:
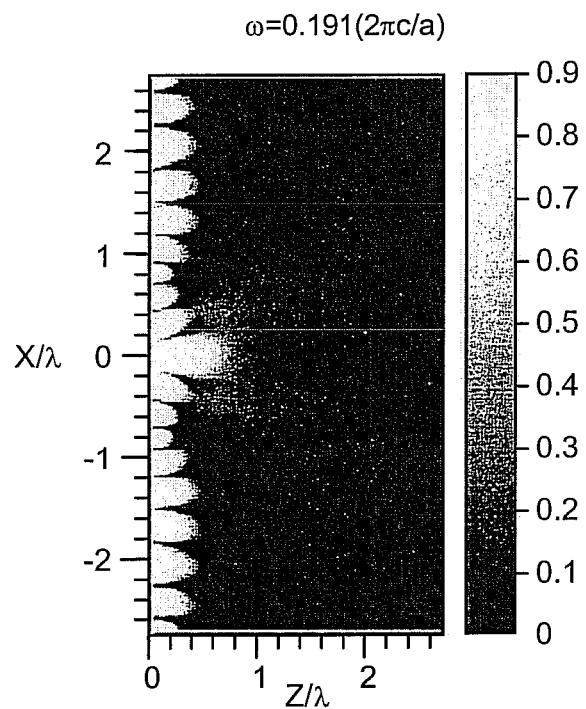
Figure 22B:
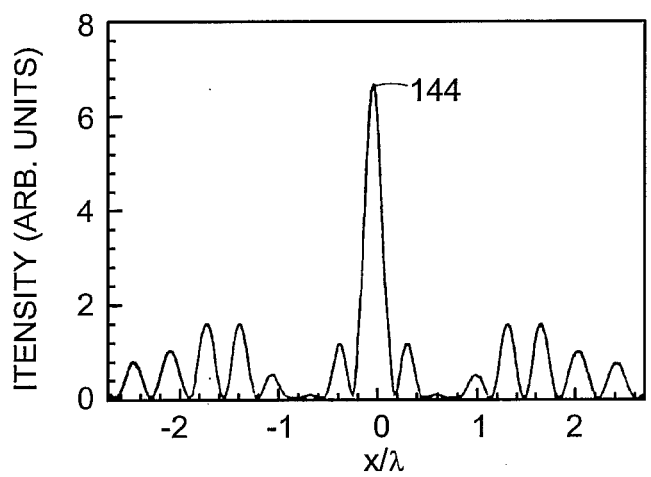
Figure 22C:
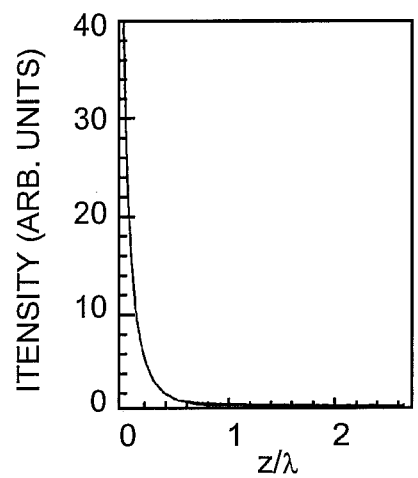

FIGS. 20A, 21A and 22A show intensity distributions in the image region. The x axis is the transverse direction, the z axis is the direction perpendicular to the slab, and the right surface of the slab is at z=0. FIGS. 20B, 21B and 22B show a transverse plot of the image intensity at the z-position of AANR focusing. FIGS. 20C, 21C and 22C show a image intensity plots along the z axis.

For $\omega=0.193(2\pi c/a)$, the operation frequency is outside the frequency range of the flat surface bands a shown in FIGS. 20A-20C. A clear intensity maximum in free space can be observed at 140. The transverse x-size of this peak is $0.66\lambda<\lambda$, demonstrating that the contribution of evanescent waves to imaging is comparable to that of propagating waves. This situation, however, still possesses an intensity maximum in the region z>0 and is in the moderate subwavelength regime.

If $\omega$ is decreased slightly to $\omega=0.192(2\pi c/a)$, the frequency falls inside the narrow range of the surface mode frequencies as shown in FIGS. 21A-21C. These surface modes are resonantly excited to have large amplitudes 142, as evidenced by the exponential decay of intensity along z axis, and they now completely dominate the image. The focusing effect of propagating waves becomes insignificant against this strong background. Many closely-spaced, near-periodic strong peaks occur in the AANR image plane, in striking contrast to the familiar appearance of a focused optical image. Due- to the exponential decay of intensity along the z axis and the delocalized field distribution in the transverse direction, neither the z-coordinate nor the transverse location of the source can be easily retrieved from this image pattern. This image field pattern is hence undesirable for imaging purposes, and should instead be exploited in situations where enhanced intensity in an extended spatial region is preferred.

An image pattern with intermediate behavior between these two situations can occur, for example, if we take $\omega$ to be $\omega=0.191(2\pi c/a)$ as shown in FIGS. 22A-22C. This frequency is outside the flat surface band frequency range, and amplified evanescent waves are still present in the image space, which create an exponentially decaying intensity profile along the z axis. In contrast to the case in the second row, a distinct intensity peak 144 may now appear within a plane of constant z shown in the third row, with a size significantly smaller than wavelength. Here we have actually achieved a focusing size of $0.45\lambda$ at approximately the AANR image plane, corresponding to the extreme subwavelength limit. We have therefore discovered a superlensing image pattern quite similar to that considered in the original perfect lens proposal, in the present case with an upper cutoff wavevector, without requiring negative-index materials.

In short, these results establish that superlensing is possible with carefully designed photonic crystals, and that large modifications to the image field distribution may be achieved due to the presence of evanescent light. It is also clear that the superlens image pattern depends sensitively on the detailed balance between propagating and evanescent waves, and can be tuned with great flexibility with photonic crystals near their bound photon states.

Figure 23:
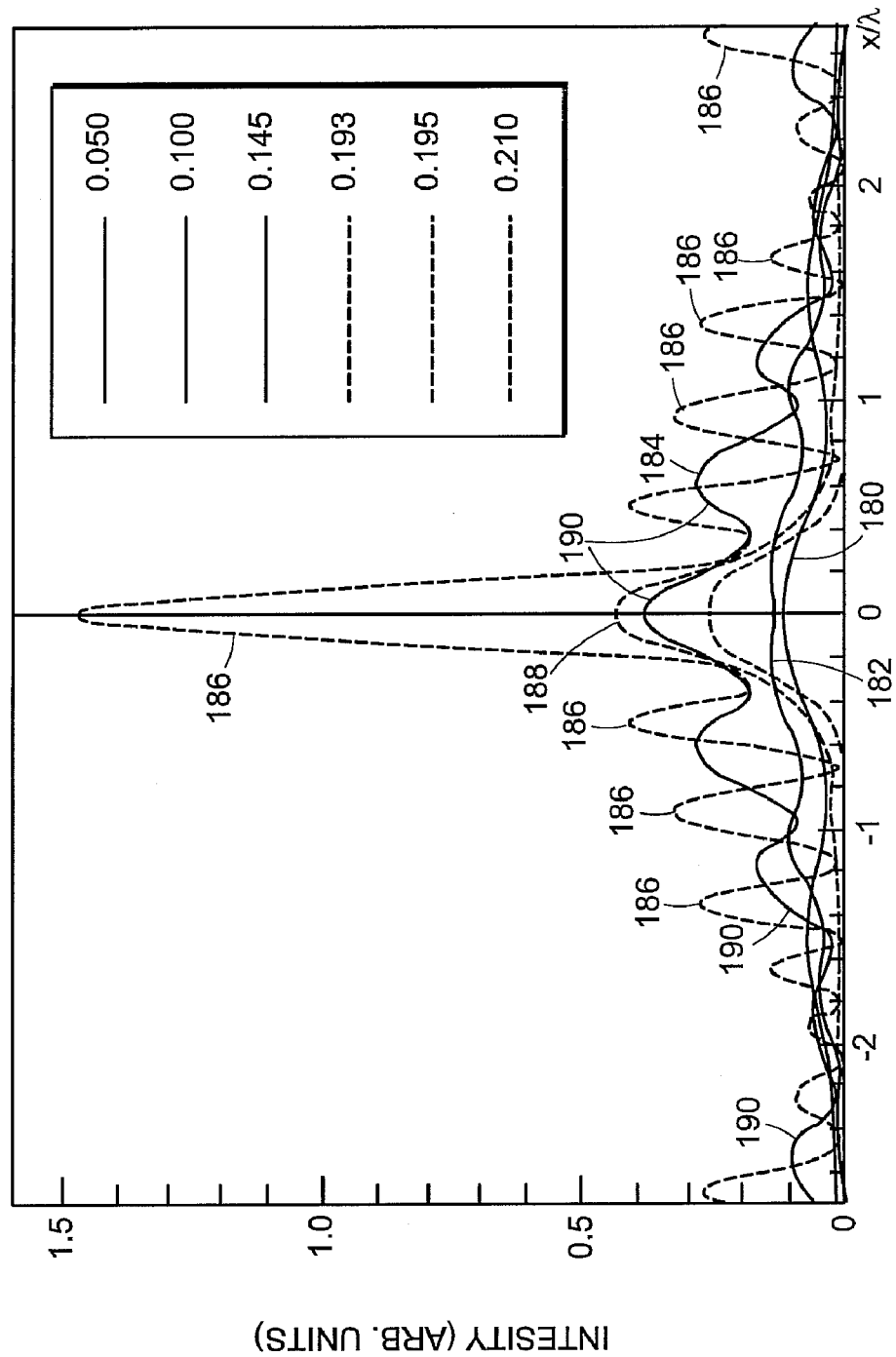
FIGS. 23 and 24 show illustrative diagrammatic views of intensity profiles of systems using photonic crystals in accordance with further embodiments of the invention.
Figure 24:
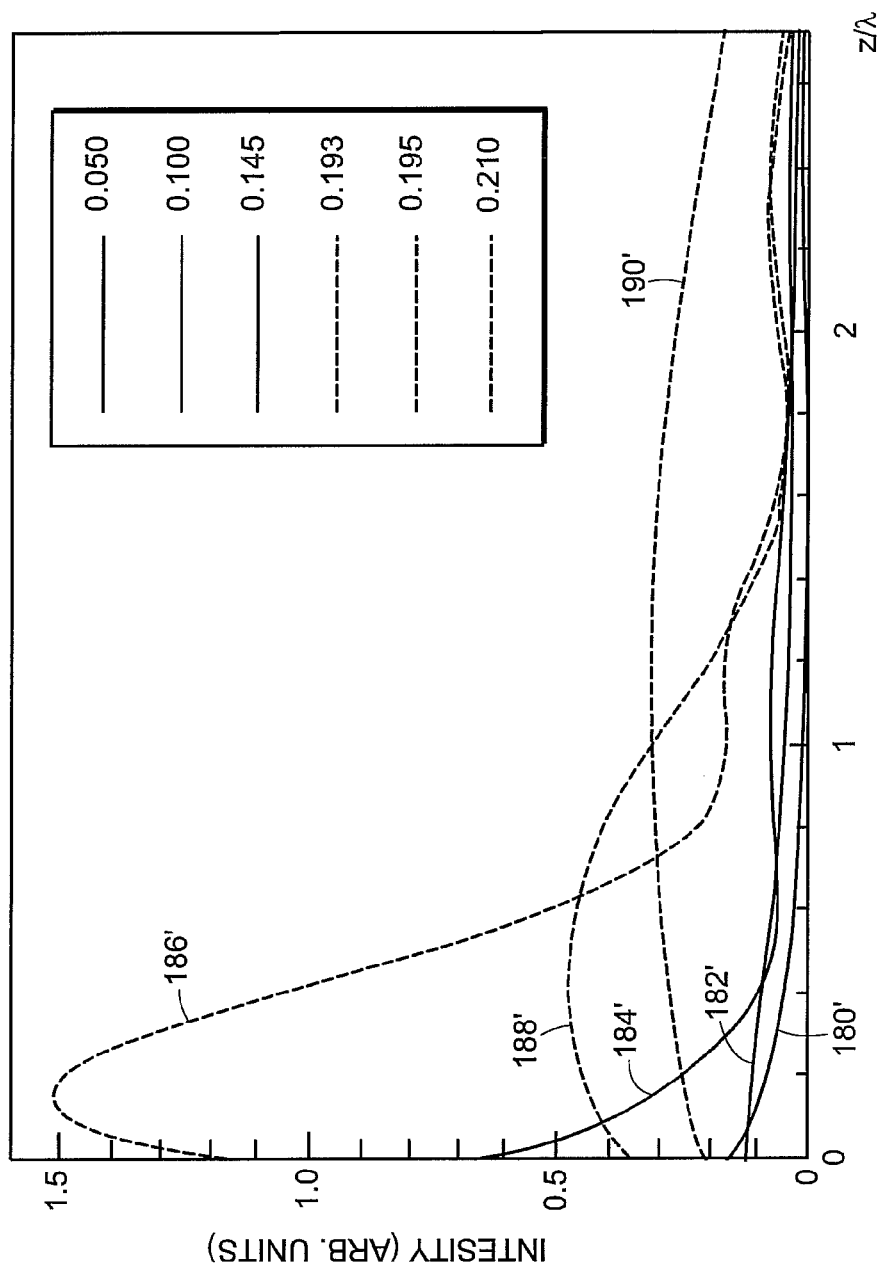

FIGS. 23 and 24 show numerical results of the imaging for various frequencies throughout the first photonic band gap for a structure in accordance with an embodiment. FIG. 23 shows the intensity distribution along the transverse direction, commonly measured at $z=0.5a_s$ for several frequencies shown at 180 (0.050), 182 (0.100), 184 (0.145), 186 (0.193), 188 (0.195) and 190 (0.210). The z value is chosen for exhibition of large near-field effects at certain frequencies (e.g., $\omega=0.145(2\pi c/a)$). The transverse intensity distribution at larger z values has a similar-shaped background but weaker near-field modulations. FIG. 24 shows intensity distribution along the z axis for the same frequencies 180', 182', 184', 186', 188' and 190' corresponding to each curve in units of $(2\pi c/a)$.

For frequencies lower than the AANR range ($\omega=0.050$, 0.100, and 0.145 $(2\pi c/a)$), since most of the propagating waves do not experience negative refraction and are not focused, a broad background peak is always present in the transverse direction. Note that $\omega=0.145(2\pi c/a)$ is close to the band edge where there are many flat bands of guided photon bound modes that may be resonantly excited. Consequently, significant subwavelength surface resonance features appear on the broad background behind the slab. The overall resolution, however, is now determined by the background, which is spatially broad and does not correspond to a subwavelength imaging effect. For frequencies above the AANR range ($\omega=0.194$ and 0.210 $(2\pi c/a)$), since some of the incident propagating radiation from air will experience total external reflection, the transverse resolution is typically limited to be larger than or equal to the operating wavelength. All of these may be compared to $\omega=0.193$ $(2\pi c/a)$ where the extraordinary superlensing enhancement in both the imaging resolution and intensity are shown. From this analysis, it is determined that the only frequencies at which one may observe superlensing in this case are inside the AANR range and close to a flat surface band.

Figure 25:
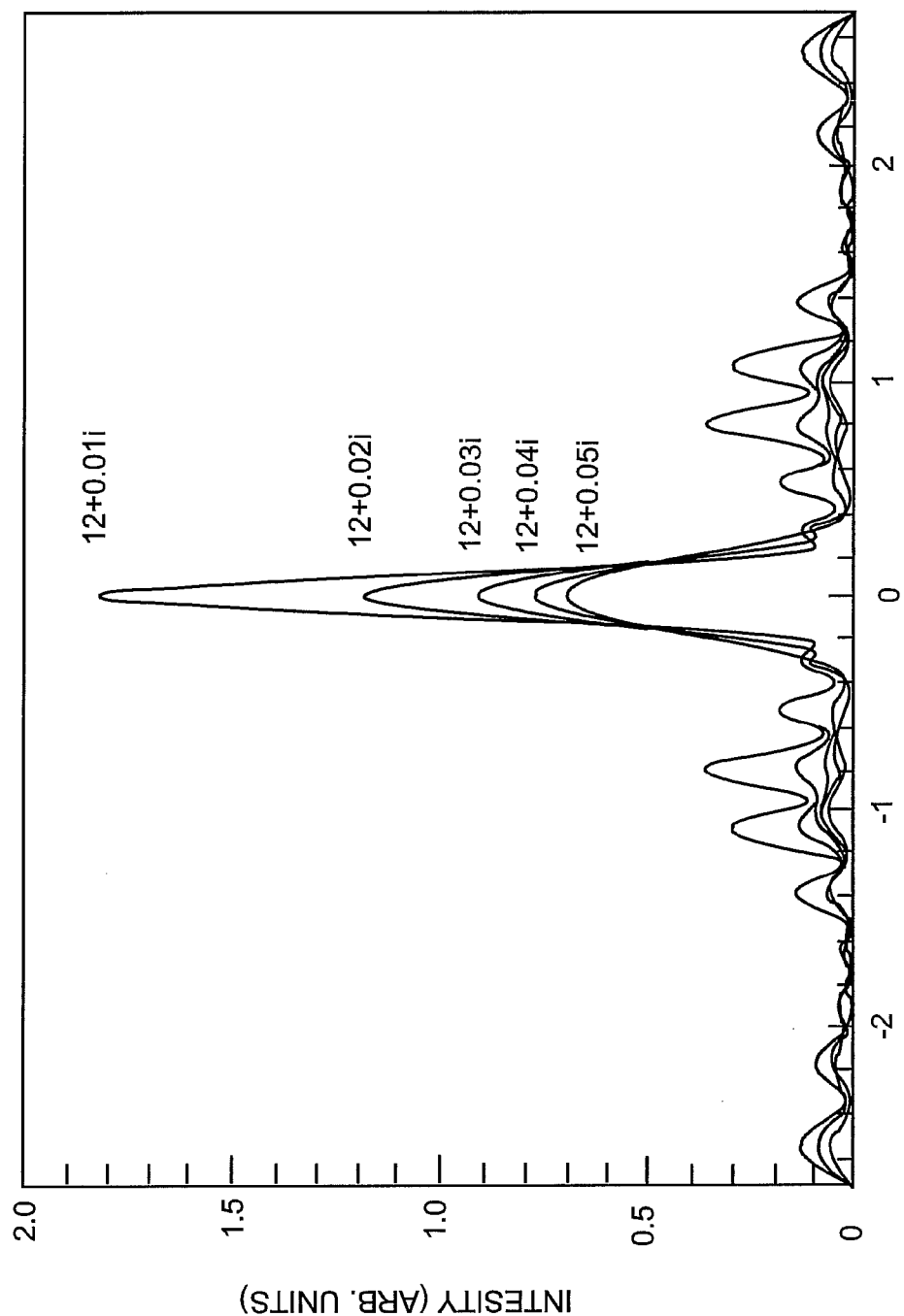
FIG. 25 shows an illustrative diagrammatic view of an intensity profile for a system using photonic crystals in accordance with another embodiments of the invention.

The above discussion has focused on ideal situations with no material absorption of light or structural imperfections. In practice, material losses are present, which means that no transmission considered above will be truly infinite. In general, appreciable material losses may impose sever limitations to the transmission coefficients of evanescent waves, in a manner similar to that of the intrinsic energy leakage rate of a crystal mode above the light line, which in turn reduces the superlensing effect. It is also expected, however, that in the limit of extremely small material loss, in the sense of a perfect lens, the above discussed findings with regard to a superlens are valid. For example, the focusing effect in a slightly lossy photonic crystal is shown in FIG. 25. FIG. 25 shows the calculated near-field intensity distributions in z>0 for a point source of various frequencies throughout the first photon band for lossy photonic crystals. Each inset number corresponds to the permittivity of the dielectric host for the corresponding curve. The intensity is plotted in the plane $z=a_s$ at the frequency $\omega=0.191(2\pi c/a)$. The losses are modeled as a positive imaginary part on the permittivity $\epsilon$ of the dielectric host, and results are determined at the extreme subwavelength frequency ω=0.191 (2πc/a) for ε starting from ε=12+0.01i up to 12+0.05i. As the losses increase, the strength of the transmitted near-fields is attenuated, and the subwavelength features in the central image peak gradually disappear. It is clear that a resolution at or below Δ=0.5λ for a localized intensity peak in x is still achievable if ε≦12+ 0.01i. The ultimate resolution limit of a superlens is, in fact, provided by the following:

$$\frac{a_s \lambda}{\lambda - a_s} < \Delta < 2a_s$$

Thus, the resolution of a photonic crystal superlens at a single frequency is limited by its surface period $a_s$ instead of the wavelength of operation λ. Superlensing well below the wavelength is in fact possible in a positive-index photonic crystal.

The effects of surface imperfections on subwavelength imaging may also be qualitatively analyzed. The defects may be considered to occur only on a length scale that is smaller than a lattice constant, and thus much smaller than the operating wavelength, with corresponding little influence on propagating waves. Since the transmission of evanescent waves depends sensitively on the bound surface photon states, which in turn depend sensitively on the surface structure, imperfections are expected to be most influenced on the crystal surface. Their effects may thus be minimized by improving the surface quality. Another type of structural imperfection is the finite lateral size of the crystal. The FDTD method may be employed to analyze such finite systems, and it has been found that for a 20-period-wide slab, a focusing resolution of Δ=0.6λ may still be obtained.

Figure 26:
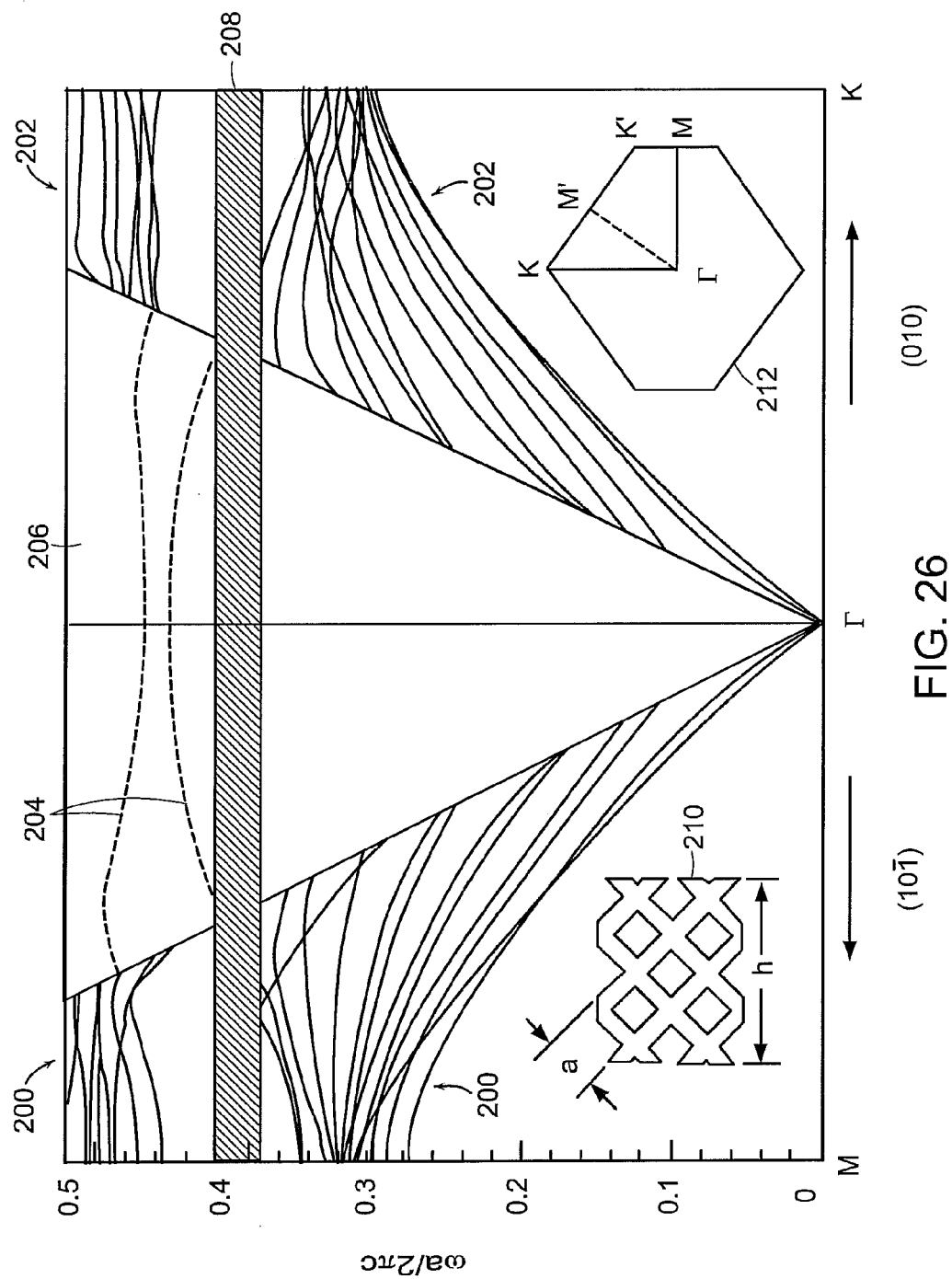
FIG. 26 shows an illustrative diagrammatic view of a band structure of a photonic crystal in accordance with a further embodiment of the invention.

Because the superlensing occurs in the first photon band, it should also be directly applicable to two-dimensional photonic crystal systems suspended in three-dimensions. A extension of this into a full three-dimensional system is also possible, requiring further modeling. For example, in three dimensions, the resolution of focusing with infinite aperture but without evanescent waves is still limited by the wavelength λ, while the surface periodicity discussed above should be replaced by the reciprocal of the minimum radius of the surface Brillouin zone. As shown in FIG. 26, the results of the computed bound photon modes of a slab of a three-dimensional photonic crystal. In particular, FIG. 26 shows bound photon modes and projected band structures for a three-dimensional photonic crystal that is capable of AANR. The bound photon modes are shown at 200 and 202, and the outlines for projected photonic band structure on the surface Brillouin zone are shown at 204. The light cone is shown at 206 and the AANR frequency range is shown at 208. A cross-section of the crystal is shown at the insert 210 and the surface Brillouin zone is shown at the insert 212. The thickness of the photonic crystal slab is h=3.47a. This photonic crystal enables AANR in full three-dimensions, and is most effective for waves polarized along (10$\bar{1}$). The surface band structure along ΓK and ΓM bears a striking similarity to the TE and TM slab polarization bands of a dispersive negative-index materials when the direction of light polarization is taken into account. For the particular surface termination shown in FIG. 26, it is possible to obtain surface states within the AANR range of this photonic crystal. Since there is still a vast amount of freedom in tuning the fine details of the crystal surface structure without breaking the periodicity, particular designs exist that lead to flat surface bands and may enable superlensing in full three-dimensions. This tenability and flexibility should make photonic crystals an excellent candidate in manipulating and focusing light on subwavelength scales, especially in the optical regime.

The principles of amplified transmission of evanescent waves and superlensing in general photonic crystals are therefore evident, and specific designs of superlenses based on AANR in photonic crystals as well as a numerical study of their subwavelength imaging properties in two-dimensions are disclosed. The interplay between propagating and evanescent waves may lead to various image behaviors not possible with conventional lenses in geometric optics.

In still further embodiments, these principles may be applied to the propagation of waves through systems containing metallic components (e.g., metallic/metallodielectric photonic crystals). The use of ideal metals is considered, in which the electric field is everywhere zero without any ohmic losses. Such an ideal metal is the simplest metallic model, is appropriate in the microwave regime, and may also give a useful estimate at infrared frequencies. In contrast to left-handed materials, which currently have two-dimensional functionalities but require an intrinsically three-dimensional analysis, the metallic photonic crystals reviewed here present a simpler concept in design: a two-dimensional analysis suffices for all two-dimensional effects, and a three-dimensional crystal may realize truly three-dimensional phenomena. Compared to its all-dielectric counterpart, a metallic photonic crystal also possesses some differences and even advantages in achieving negative refraction. The most significant advantage is that the required refractive index for the crystal constituents may be lowered in a metallic photonic crystal, making negative refraction and subwavelength imaging possible using a broader range of materials. The presence of metals in a photonic crystal may also increase polatization dependence and improve focusing ability. The FDTD method is again employed here to determine the photonic band structure in the reciprocal space and to perform numerical simulations in the real space.

Again, the use of AANR is realized by using a constant-frequency contour near the top region of a photonic band that is all-convex and single-branch at a sufficiently low frequency. The results are mainly in the first photonic band.

Figure 27:
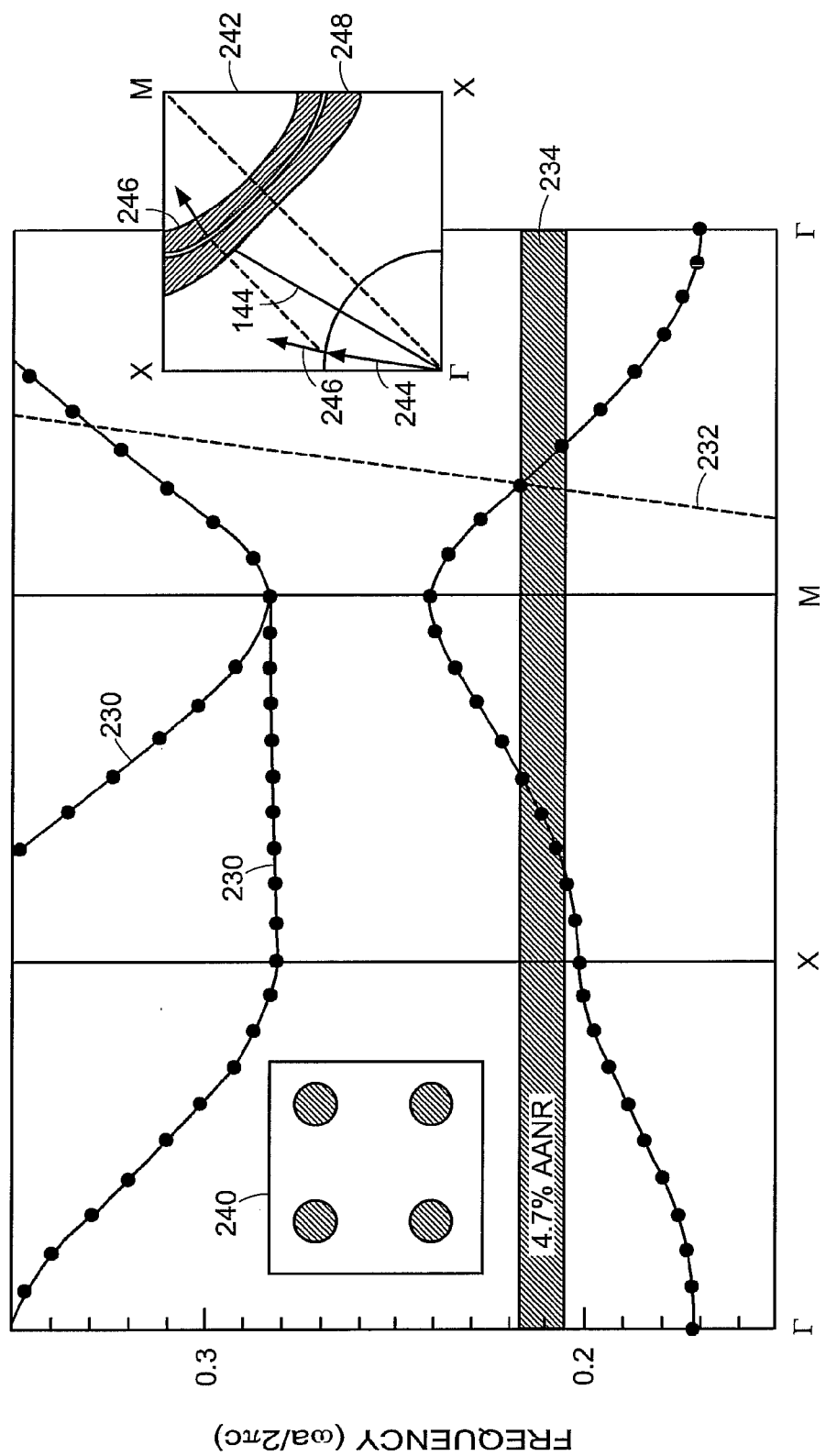
FIG. 27 shows an illustrative diagrammatic view of a frequency band structure of a metallic photonic crystal in accordance with another embodiment of the invention.

A two-dimensional square lattice (period a) of metallic cylinders immersed in a background medium with dielectric constant ε=9 (e.g., alumina at microwave frequencies). The cylinder radii are chosen to be r=0.2a, corresponding to a modest filling fraction of 13%. In a two-dimensional system, light waves may be classified into TE (electric field in the two-dimensional plane) or TM (electric field parallel to the cylinders) polarizations. The TM polarization is particularly interesting for the present metallic system in which the Bragg scattering effect occurs as if in a dielectric photonic crystal with infinite dielectric contrast. The TM waves, therefore, now experience the maximum possible artificial spatial modulation in a photonic crystal. The TM band may be determined in FDTD by applying Bloch-periodic boundary conditions to a unit cell. The results are shown in FIG. 27 in which the first few bands of a two-dimensional square lattice of metallic cylinders in dielectric are shown. The photonic dispersion relations are connected by lines 230. The line 232 indicates the light line centered on the M point. The AANR region 234 is the frequency range of negative refraction for all incident angles. The insert 240 is a schematic illustration of the photonic crystal, and the insert 242 is a portrayal of the Brillouin zone and the refraction in wavevector space. Air modes and photonic crystal modes are indicated. The arrows 244 indicate the phase vector k, and the arrows 246 indicate the group (energy) velocity $\partial\omega/\partial k$. The region 248 is the phase space corresponding to the AANR frequency range. The permitted photonic bands start at the frequency $\omega=0.172(2\pi c/a)$, and there is a Bragg band gap between $0.242(2\pi c/a)$ and $0.280(2\pi c/a)$. Since the first photonic band below the Bragg band gap has a shape similar to that in a dielectric photonic crystal, we may determine a frequency band as discussed above. Here, even for the modest filling ratio, the constant-frequency contour in the first band becomes all-convex for frequencies starting at $0.217(2\pi c/a)$ all the way through the band edge $0.242(2\pi c/a)$. As indicated at the insert 242 in FIG. 27, a light beam incident on the (11) ΓM surface will then couple to a single Bloch mode in the crystal. The propagation direction of that Bloch mode, being along the group velocity (i.e., the gradient direction of the constant-frequency contours), is on the negative side of the surface normal, giving rise to negative refraction. Furthermore, the phase-space region of air spanned by all the propagating waves and projected on the (11) direction may be matched in size to that of the photonic crystal, enabling AANR. This is also indicated in a frequency range shown in FIG. 27. The existence of AANR is the starting point for superlensing in photonic crystals. Note that a negative refraction effect also exists in a crystal made of the same metallic cylinders of air instead of in a background dielectric. The photonic frequencies, however, of the metal-in-air case increase by a factor of $\sqrt{\epsilon}=3$, making the air phase space much larger than that of the crystal and thus destroying AANR.

Figure 28:
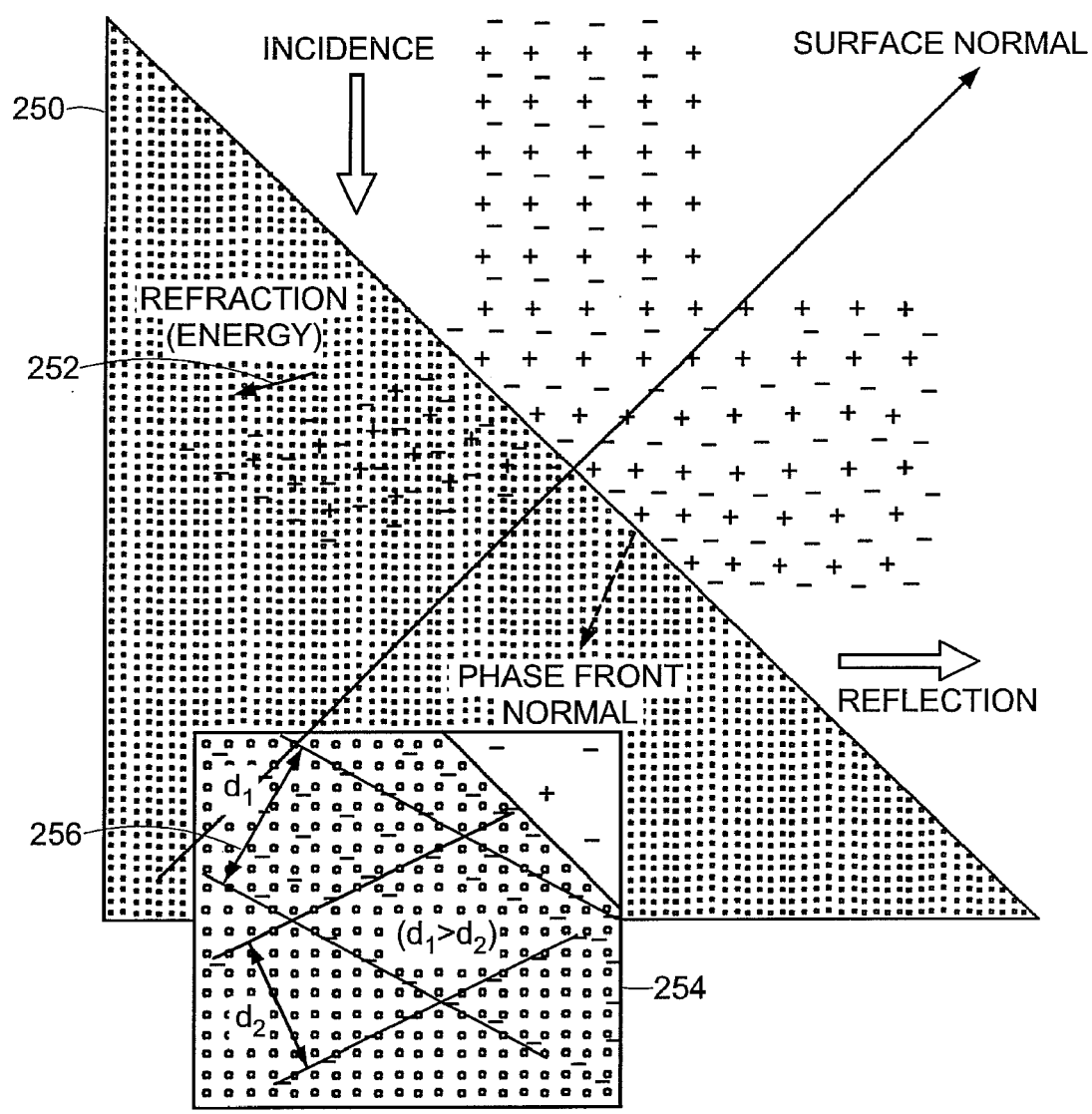
FIG. 28 shows an electric field pattern for a system employing a metallic photonic crystal in accordance with an embodiment of the invention.

A computational example of negative refraction in the present photonic crystal may be developed as follows. Here, a continuous-wave (CW) Gaussian beam of frequency $\omega_0=0.216(2\pi c/a)$ and a half width $\sigma=5.8\lambda_0$ (or $\lambda_0=2\pi c/\omega_0$) is launched at 45 degrees incidence toward the (11) surface and subsequently reflects away from and refracts into the metallic photonic crystal. In the computation, we use a finite crystal and impose perfectly matched layer (PML) boundary regions. FIG. 28 shows a snapshot of this refraction process in which the electric field E is shown to be perpendicular to the plane. The dielectric and metallic boundaries are shown at 250. It may be clearly seen that the overall electromagnetic energy in the metallic photonic crystal travels on the wrong side of the surface normal. The refraction angle (as shown generally at 252) is about −12°, consistent with results from the wavevector space. The insert 254 shows two possible ways for constructing phase fronts from the field pattern. The set of phase fronts with the maximum wavelength (a maximum 4 wavelength distance $d_l$ of that set is shown at 256) is considered to be the phase fronts of the refracted beam.

If we look closely at the refracted field profile in the photonic crystal, we can see that the constant-phase locations lie on parallel straight lines and form phase fronts in the photonic crystal. However, since the constant-phase regions in the crystal are located in discrete cells and separated from each other, there exist multiple ways to connect them and hence multiple choices of phase-front definition. See FIG. 28. This reflects the fact that, in a photonic crystal, k is only defined up to a reciprocal lattice vector G. Here, we define the phase fronts for the refracted beam to be the set of constant-phase lines with the largest wavelength, which corresponds the smallest |k| and hence the unique k in the first Brillouin zone. We then choose the gradient direction to this set to be the direction of the phase-front normal. These refracted phase fronts gradually move into the crystal as time progresses and their normal points toward the positive side of the surface normal. This phenomenon is naturally explained by the inset 242 of FIG. 27, which shows that k experiences positive refraction while $\partial\omega/\partial k$ goes negative. It also explains the different physics of the present negative refraction as compared to that in the left-handed materials: here negative refraction is realized in the first photonic band that consists of forward-propagating waves (k·$\partial\omega/\partial k$>0), not backward-propagating waves as in a left-handed material. The present effect bears certain similarity to the negative refraction of energy and positive refraction of modulation interference fronts. However, it is important to note that only a CW wave of a single frequency is used above and the phase fronts reviewed above are not the modulation interference fronts, which must be made from multiple frequencies.

The TM AANR frequency range for several other values of cylinder radii are shown in Table 1 below.

| Cylinder radii (r/a) | Lower limit ($\omega_l a/2\pi c$) | upper limit ($\omega_u a/2\pi c$) | band edge at M ($\omega_M a/2\pi c$) |
|---|---|---|---|
| 0.10 | 0.195 | 0.196 | 0.236 |
| 0.15 | 0.196 | 0.205 | 0.238 |
| 0.20 | 0.207 | 0.217 | 0.242 |
| 0.25 | 0.231 | 0.238 | 0.255 |
| 0.30 | 0.257 | 0.261 | 0.271 |

The AANR frequency range is between $\omega_l$ and $\omega_u$, and the M edge of the first band is also listed for reference. The data show a steady increase of all frequencies with cylinder radii. For r/a>0.3, the TM bands in metallic photonic crystals have very narrow bandwidths and thus small AANR ranges. These TM modes in two dimensions may be easily realized by sandwiching a finite-height two-dimensional crystal between parallel metallic plates. The AANR frequencies in the first band for the TE polarization have also bee determined, which do not show large shifts with the cylinder sizes (below $0.25(2\pi c/a)$ for all r). In the TE case the metallic photonic crystals behave in a manner very similar to an air-in-dielectric all-dielectric crystal, in which large filling ratio (r/a>0.3) is typically preferred in achieving TE AANR. Thus, a two dimensional metallic photonic crystal with large cylinders can allow AANR for the TE polarization but exhibit complete reflection for TM waves of the same frequency. These results may be compared to those in all-dielectric photonic crystals, where there exists less distinction in whether AANR exists between the TE and TM polarizations.

For three-dimensional periodic systems a body-centered cubic (BCC) lattice of nonoverlapping metallic spheres in a background dielectric may be employed. It has been determined that AANR in full three-dimensions may be accomplished near the frequency $\omega=0.385(2\pi c/a)$ for a modest background permittivity of $\epsilon=3$ and a sphere diameter of 0.85a, with a being the side length of the conventional cubic cell of the BCC lattice. This situation is analogous to the discussion of three-dimensional dielectric photonic crystals above. It is worth noting that this three-dimensional metallodielectric crystal has important advantages over an all-dielectric structure in achieving AANR: the index requirement for the background matrix is quite low and can be satisfied for many materials, and straightforward fabrication procedures are available at present.

Using the AANR frequencies discussed above for metallic photonic crystals, it is possible to similarly investigate subwavelength imaging effect of a planar by considering evanescent waves coupling to the bound states of the slab. Note that amplification of one evanescent wave alone is independent of negative refraction and can be done using metallic surface plasmons.

Figure 29:
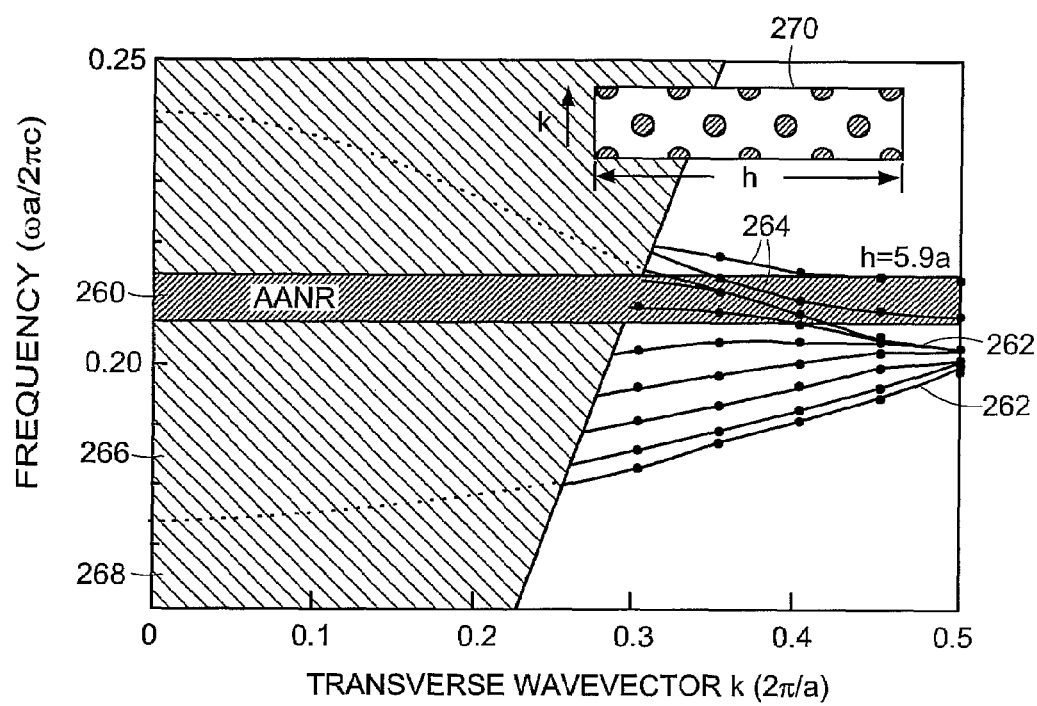
FIG. 29 shows an illustrative diagrammatic view of a frequency band structure of a metallic photonic crystal in accordance with a further embodiment of the invention.

In the following discussion, we focus on a two dimensional metallic photonic crystal for simplicity. Here, the bound-photon band structure of a photonic-crystal slab finite in thickness but infinite in the transverse direction is of interest. We place the slab in the center of a computational supercell that is exactly one surface-period wide along the transverse direction and a few times longer than the slab thickness h in the (11) normal direction. The boundary conditions of the computational cell are Bloch-periodic on the transverse sides with PML regions on the normal sides. The bound photon states computed in this way for the crystal in FIG. 27 are plotted in FIG. 29. As shown in FIG. 29, when h changes from 5.9a to 6.0a, relatively little variation occurs in the bulk-guided modes, but the frequencies of the surface mode sweep through the AANR frequency range 260. Specifically, FIG. 29 shows bound frequency modes inside a slab metallic photonic crystal plotted on top of the projected surface band structure. The bulk guide modes are indicated at 262, and the surface guide modes are indicated at 264. The bulk band structure projected to the surface direction is indicated at 266, and the light cone is indicated at 268. The insert 270 shows schematic illustrations of the photonic crystals slab of finite thickness h. Flat portions exist in both the surface and the bulk bound states at common frequencies covering the range of wavevectors outside the light cone. These bound states are the poles of transmission for evanescent waves, and consequently they can be used to amplify incident evanescent waves, i.e., to transfer a range of near fields on one side of the slab to the other side. In this way, images formed by AANR may be further focused to subwavelength resolutions.

Figure 30A:
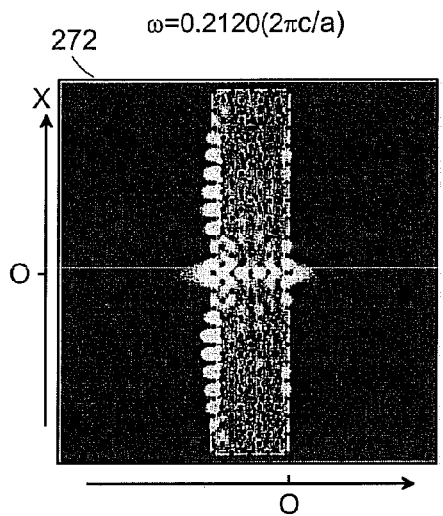
FIGS. 30A-30C show illustrative diagrammatic views of various characteristics of an imaging system using a photonic crystal in accordance with an embodiment of the invention.
Figure 31A:
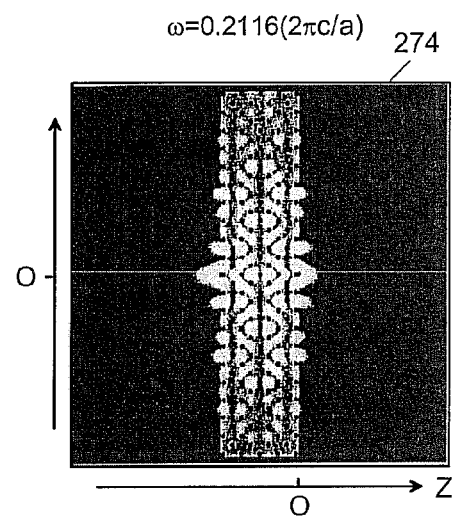
FIGS. 31A-31C show illustrative diagrammatic views of various characteristics of an imaging system using a photonic crystal in accordance with another embodiment of the invention.
Figure 30B:
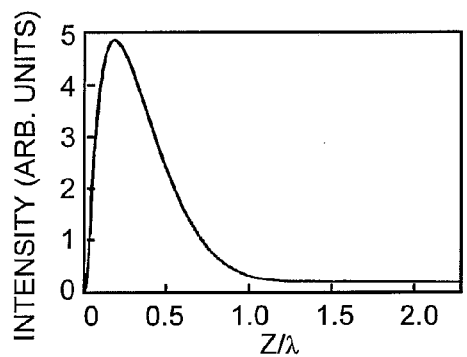
Figure 31B:
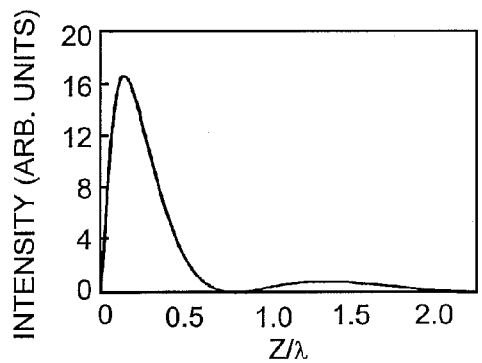
Figure 30C:
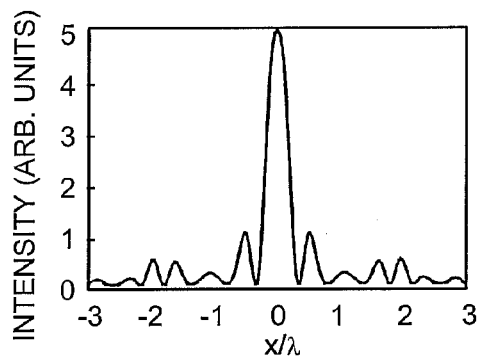
Figure 31C:
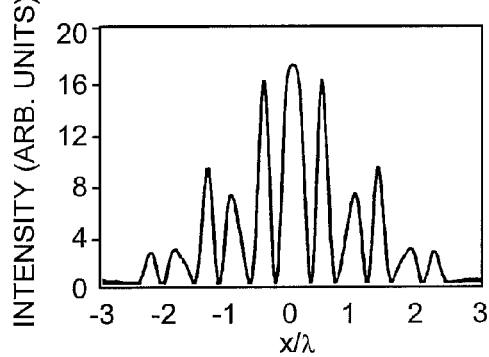

FDTD simulations were performed with PML boundary conditions for subwavelength focusing using a metallic-photonic-crystal slab of thickness 6.0a. The results are summarized in FIGS. 30A-30C and 31A-31C, which show time-averaged intensity $|E|^2$ distributions of two slightly different frequencies close to that of the flat bound photon bands in FIG. 29. FIGS. 30A-30C correspond to the results for a CW point source placed at 0.207a away from the left surface of the slab, for the frequency value of $\omega=0.2120(2\pi c/a)$. FIGS. 31A-31C correspond to the results for a CW point source placed at 0.207a away from the left surface of the slab, for the frequency value of $\omega=0.2116(2\pi c/a)$. FIGS. 30A and 31A show the intensity distributions 272 and 274 respectively in the systems marked with the directions of coordinate axes x and z. The intensity is determined as the averaged square of the electric field value between 2174 and 2416 periods. The point source is placed at $(z, x)=(-6.21a, 0)$. The intensity distribution is plotted in FIGS. 30B and 31B along the surface direction in the image space (x=0, z>0). The intensity distribution is plotted in FIGS. 30C and 31C measured at the z value for the intensity peak in FIGS. 30B and 31B respectively. The two frequencies illustrate the delicate interplay between the propagating and evanescent waves in image formation. For $\omega=0.2120(2\pi c/a)$, an isolated intensity maximum with width about 0.67λ may be realized in the image space z>0 if the evanescent waves are amplified to values comparable with those of the propagating waves. However, because of the resonant nature of the present situation (no loss is assumed) and the extremely small group velocities of the bound photon modes, some transmitted evanescent waves can also have such an extraordinarily enhanced amplitude that they dominate over other evanescent and all propagating waves. This leads to the enhanced resonance effect at $\omega=0.2116(2\pi c/a)$, for which large field oscillations exist in both the bulk crystal and the surfaces, and the transverse image profile becomes delocalized and is no longer an isolated peak. Both scenarios here demonstrate the amplification effect of evanescent waves across the photonic-crystal slab. Moreover, the situation in which the propagating and evanescent waves are balanced, i.e., $\omega=0.212(2\pi c/a)$ in this example, is particularly interesting because it illustrates the focusing of evanescent waves and the subwavelength imaging capacity of the metallic photonic crystal. In the present case, the discreteness of the computational grid limits our tuning capacity for bound photon states, but in an ideal situation, with a suitably tuned photonic-crystal surface structure where the bound photon bands are sufficiently flat and all evanescent waves inside the first Brillouin zone are amplified, the full imaging width will only be limited by the surface periodicity and not by the wavelength of light. A distinctive feature for the metallic photonic crystal studied here is that, since fields cannot enter the ideal metal, the spatial variation of near-field waves can be stronger than in the dielectric photonic-crystal case. For example, the intensity is always zero near the metallic components on the surface, and a strong intensity maximum along z axis always exists in the image space, even in the limit of extremely large evanescent wave strengths near the surface. This effect creates a very localized and intense optical focus, in free space and might be useful in realistic applications.

These calculations are carried out for ideal systems with monochromatic sources and lossless metals. These CW results may also be applied to situations with finite pulses, as long as the pulse bandwidth is sufficiently narrow. An estimate for the upper limit of the pulse bandwidth at which negative refraction is still observable is 4%-5%, i.e., the frequency range of AANR. For subwavelength imaging, which relies on flat bound photon bands with a strong group-velocity dispersion, the required bandwidth is narrower and should be smaller than roughly 0.2%, corresponding to the frequency difference in FIGS. 30A-30C and 31A-31C. For small absorption losses in metals, their qualitative effect is to introduce a finite decay length to propagating waves in the crystal, and negative refraction can be observed as long as this decay length exceeds the sample dimensions. For evanescent waves, losses bring a finite lifetime to the bound photon modes and reduce the magnitude of the associated near-field amplification. Provided that these loss-induced modifications are also small for wavevectors inside a finite region outside the light cone in FIG. 29, the focusing effect of planar slabs would continue to be subwavelength. All of these requirements can be easily satisfied in the microwave regime, suggesting that both AANR and subwavelength imaging in metallic photonic crystals are amenable to experimental studies.

It has been demonstrated, therefore, that metallic structures may also be designed in a simple way to realize both negative refraction and subwavelength imaging without relying on the concept of a left-handed material. These metallic designs can offer specific characteristics and realistic advantages as compared to their all-dielectric counterparts. The present work represents an alternative method of achieving unusual optical phenomena using deliberately designed metallic structures.

Those skilled in the art will appreciate that numerous modifications and variations may be made to the above disclosed embodiments without departing from the spirit and scope of the invention.

What is claimed is:

1. A periodic electromagnetic medium comprising a surface that provides an interface with an ambient medium; and a periodic structure that provides a plurality of photonic bands and the medium within said range of frequencies cannot be accurately described by a medium possessing only a single photonic band, said plurality of photonic bands including a lowest photonic band and that provides negative refraction within said medium of an incident electromagnetic field incident on said surface, wherein said incident electromagnetic field is within a range of frequencies within said lowest photonic band.

2. The periodic electromagnetic medium as claimed in claim 1, wherein said periodic structure provides single-beam negative refraction within said medium of an incident electromagnetic field incident on said surface.

3. The periodic electromagnetic medium as claimed in claim 1, wherein said medium has a positive effective index.

4. The periodic electromagnetic medium as claimed in claim 1, wherein said medium has a negative effective index.

5. The periodic electromagnetic medium as claimed in claim 1, wherein said medium is comprised of dielectric material.

6. The periodic electromagnetic medium as claimed in claim 1, wherein said medium is comprised of metallic material.

7. The periodic electromagnetic medium as claimed in claim 1, wherein said periodic structure is a two-dimensional periodic structure.

8. The periodic electromagnetic medium as claimed in claim 1, wherein said periodic structure is a three-dimensional periodic structure.

9. The periodic electromagnetic medium as claimed in claim 1, wherein said periodic structure provides negative refraction within said medium of an incident electromagnetic field incident on said surface at any angle of incidence.

10. The periodic electromagnetic medium as claimed in claim 1, wherein said medium forms a lens in an imaging system.

11. A three-dimensionally periodic electromagnetic medium, said medium comprising a surface that provides an interface with an ambient medium; and a periodic structure that provides negative refraction within said medium of an incident electromagnetic field incident on said surface, wherein said incident electromagnetic field is within a range of frequencies.

12. The three-dimensional periodic electromagnetic medium as claimed in claim 11, wherein said periodic structure provides single-beam negative refraction within said medium of an incident electromagnetic field incident on said surface.

13. The three-dimensional periodic electromagnetic medium as claimed in claim 11, wherein said medium has a positive effective index.

14. The three-dimensional periodic electromagnetic medium as claimed in claim 11, wherein said medium has a negative effective index.

15. The three-dimensional periodic electromagnetic medium as claimed in claim 11, wherein said medium is comprised of dielectric material.

16. The three-dimensional periodic electromagnetic medium as claimed in claim 11, wherein said medium is comprised of metallic material.

17. The three-dimensional periodic electromagnetic medium as claimed in claim 11, wherein said periodic structure provides negative refraction within said medium of an incident electromagnetic field incident on said surface at any angle of incidence.

18. The three-dimensional periodic electromagnetic medium as claimed in claim 11, wherein said medium forms a lens in an imaging system.

19. A periodic electromagnetic medium that is comprised of a metallic material having a positive effective index and comprising a first surface for receiving an incident electromagnetic field having a first wavelength; a second surface for producing a focused electromagnetic field; and a periodic structure for providing a focal spot size that is smaller than said first wavelength.

20. The periodic electromagnetic medium as claimed in claim 19, wherein said periodic structure is a two-dimensional periodic structure.

21. The periodic electromagnetic medium as claimed in claim 19, wherein said periodic structure is a three-dimensional periodic structure.

22. A transparent dielectric periodic electromagnetic medium having a negative effective index and having only transparent dielectric materials and comprising a first surface for receiving an incident electromagnetic field having a first wavelength; a second surface for producing a focused electromagnetic field; and a periodic structure for providing a focal spot size that is smaller than said first wavelength.

23. The dielectric periodic electromagnetic medium as claimed in claim 22, wherein said periodic structure is a two-dimensional periodic structure.

24. The dielectric periodic electromagnetic medium as claimed in claim 22, wherein said periodic structure is a three-dimensional periodic structure.

25. A periodic electromagnetic medium having a positive effective index and comprising a first surface for receiving an incident electromagnetic field having a first wavelength; a second surface for producing a focused electromagnetic field; and a three-dimensional periodic structure for providing a focal spot size that is smaller than said first wavelength.

26. The periodic electromagnetic medium as claimed in claim 25, wherein said medium is comprised of dielectric material.

27. The periodic electromagnetic medium as claimed in claim 25, wherein said medium is comprised of metallic material.

28. A transparent dielectric periodic electromagnetic medium having only transparent dielectric materials and comprising a first surface for receiving an incident electromagnetic field having a first wavelength; a second surface for producing a focused electromagnetic field; and a three-dimensional periodic structure for providing a focal spot size that is smaller than said first wavelength.

29. The dielectric periodic electromagnetic medium as claimed in claim 22, wherein said medium has a positive effective index.

30. The dielectric periodic electromagnetic medium as claimed in claim 22, wherein said medium has a negative effective index.

* * * * *